(12) United States Patent
Guo

(10) Patent No.: US 11,770,169 B2
(45) Date of Patent: Sep. 26, 2023

(54) CHANNEL STATE INFORMATION MEASUREMENTS IN COMMUNICATION NETWORKS

(71) Applicant: NOKIA TECHNOLOGIES OY, Espoo (FI)

(72) Inventor: Haiyou Guo, Shanghai (CN)

(73) Assignee: NOKIA TECHNOLOGIES OY, Espoo (FI)

( * ) Notice: Subject to any disclaimer, the term of this patent is extended or adjusted under 35 U.S.C. 154(b) by 353 days.

(21) Appl. No.: 17/274,958

(22) PCT Filed: Sep. 16, 2019

(86) PCT No.: PCT/CN2019/105911
§ 371 (c)(1),
(2) Date: Mar. 10, 2021

(87) PCT Pub. No.: WO2020/052682
PCT Pub. Date: Mar. 19, 2020

(65) Prior Publication Data
US 2022/0038153 A1    Feb. 3, 2022

(30) Foreign Application Priority Data
Sep. 16, 2019    (WO) ................ PCT/CN2018/105503

(51) Int. Cl.
*H04L 5/00*    (2006.01)
*H04B 7/06*    (2006.01)
*H04B 17/309*    (2015.01)

(52) U.S. Cl.
CPC ......... *H04B 7/0626* (2013.01); *H04B 17/309* (2015.01); *H04L 5/0073* (2013.01)

(58) Field of Classification Search
CPC .... H04B 7/0626; H04B 17/309; H04L 5/0073
See application file for complete search history.

(56) References Cited

U.S. PATENT DOCUMENTS

| | | | | |
|---|---|---|---|---|
| 7,954,105 | B2 * | 5/2011 | Taniguchi | G06F 3/1284 358/404 |
| 2016/0183263 | A1 * | 6/2016 | Liu | H04W 72/23 370/329 |

(Continued)

FOREIGN PATENT DOCUMENTS

| | | |
|---|---|---|
| CN | 104170411 A | 11/2014 |
| CN | 104219724 A | 12/2014 |

(Continued)

OTHER PUBLICATIONS

Office Action dated Aug. 16, 2022, corresponding to Chinese Patent Application No. 201980074301.X.

(Continued)

*Primary Examiner* — Fahmida S Chowdhury
(74) *Attorney, Agent, or Firm* — SQUIRE PATTON BOGGS (US) LLP

(57) ABSTRACT

Embodiments of the present disclosure relate to channel state information measurement in communication networks. According to embodiments of the present disclosure, the measurement resource unit, MRU, configuration is determined based on the number of MRU and the identity of the cell. The MRU configuration is scalable and the set of MRUs is reused by the network. In this way, the resources are saved and the accuracy is improved.

18 Claims, 9 Drawing Sheets

(56) References Cited

U.S. PATENT DOCUMENTS

| | | | |
|---|---|---|---|
| 2017/0154374 A1* | 6/2017 | Iglesias | G06Q 30/0629 |
| 2017/0180194 A1 | 6/2017 | Young-Woo et al. | |
| 2018/0092110 A1* | 3/2018 | Malli | H04L 5/0096 |
| 2018/0152870 A1* | 5/2018 | Park | G05D 1/0022 |
| 2018/0184315 A1* | 6/2018 | Dl | H04W 72/23 |
| 2018/0262938 A1* | 9/2018 | Liu | H04B 7/0619 |
| 2018/0279149 A1* | 9/2018 | Li | H04L 5/0032 |

FOREIGN PATENT DOCUMENTS

| | | |
|---|---|---|
| CN | 104284361 A | 1/2015 |
| CN | 107750436 A | 3/2018 |
| CN | 107771381 A | 3/2018 |
| CN | 108029027 A | 5/2018 |
| CN | 108418667 A | 8/2018 |
| WO | WO 2016/003133 A1 | 1/2016 |
| WO | 2019/069227 A1 | 4/2019 |

OTHER PUBLICATIONS

Search Report dated Aug. 8, 2022, corresponding to Chinese Patent Application No. 201980074301.X.

International Search Report and Written Opinion dated Nov. 25, 2019 corresponding to International Patent Application No. PCT/CN2019/105911.

Extended European Search Report dated May 18, 2022 corresponding to European Patent Application No. 19861180.8.

Fujitsu, "Enhancements on Multi-beam Operation," 3GPP Draft, R1-1900257, 3GPP TSG RAN WG1 Meeting #Ad-Hoc 1901, Taipei, Taiwan, Jan. 21-25, 2019, Jan. 20, 2019, XP051593171.

Nokia et al., "Enhancements on Multi-beam Operation," 3GPP Draft, R1-1900692, 3GPP TSG RAN WG1 Meeting #AH-1901, Taipei, Taiwan, Jan. 21-25, 2019, Jan. 11, 2019, XP051576232.

Intel Corporation, "Summary 3 on SCell BFR and L1-SINR," 3GPP Draft, R1-1905844, 3GPP TSG RAN WG1 Meeting #96b, Xi'an, China, Apr. 8-Apr. 12, 2019, Apr. 15, 2019, XP051707890.

* cited by examiner

CHANNEL STATE INFORMATION MEASUREMENTS IN COMMUNICATION NETWORKS

FIELD

Embodiments of the present disclosure generally relate to communication techniques, and more particularly, to methods, devices and computer readable medium for Channel State Information (CSI) measurements in communication networks.

BACKGROUND

CSI reports, irrespective of whether they are aperiodic or periodic, need measurements of channel properties, as well as the interference level. Measuring the interference level is more cumbersome and the measurement is significantly affected by the transmission activity in neighboring cells, such as cooperation selection in Coordinated Multi-Point (CoMP) and link direction assignment in dynamic Time Division Duplex (TDD).

In practice, interferences are measured as the noise on the Cell-specific Reference Signals (CRS). That is, the residual after subtracting the reference signal from the received signal in the appropriate resource elements is used as an estimate of the interference level. At low loads, this approach unfortunately often results in overestimating the interference level since the measurements are dominated by CRS transmissions in neighboring cells (assuming the same CRS positions in the neighboring cells), irrespective of the actual load in those cells. Furthermore, the device may also choose to average the interference level across multiple subframes, further adding to the uncertainty on how the interference is measured by the device.

SUMMARY

Generally, embodiments of the present disclosure relate to a method for CSI measurements in communication networks and corresponding devices.

In a first aspect, there is provided a device. The device comprises at least one processor; and at least one memory including computer program codes; the at least one memory and the computer program codes are configured to, with the at least one processor, cause the device to determine a set of measurement resource units (MRUs) shared by a group of cells, the device associated with a cell of the group of cells. The device is also caused to determine MRU configuration for the group of cells based on the number of MRUs and the number of cells, such that one or more cells are assigned with the first number of MRUs for transmission, the one or more cells are assigned with the second number of MRUs for measurement, and the number of concurrent transmissions caused by any two distinct cells is no more than a threshold number. The device is further caused to select, based on an identity of the cell and the MRU configuration, a first subset of MRUs from the set of MRUs for the device to perform transmissions. The device is yet caused to select, based on the identity of the cell and the MRU configuration, a second subset of MRUs from the set of MRUs for the device to perform measurements. The device is also caused to determine, based on the identity of the cell and the MRU configuration, a measurement matrix for the device to perform estimation.

In a second aspect, there is provided a method. The method comprises determining, at a device, a set of MRUs, shared by a group of cells, the device associated with a cell of the group of cells. The method also comprises determining MRU configuration for the group of cells based on the number of MRUs and the number of cells, such that one or more cells are assigned with the first number of MRUs for transmission, the one or more cells are assigned with the second number of MRUs for measurement, and the number of concurrent transmissions caused by any two distinct cells is no more than a threshold number. The method further comprises selecting, based on an identity of the cell and the MRU configuration, a first subset of MRUs from the set of MRUs for the device to perform transmissions. The method yet comprises selecting, based on the identity of the cell and the MRU configuration, a second subset of MRUs from the set of MRUs for the device to perform measurements. The method also comprises determining, based on the identity of the cell and the MRU configuration, a measurement matrix for the device to perform estimation.

In a third aspect, there is provided an apparatus. The apparatus comprises means for determining, at a device, a set of MRUs, shared by a group of cells, the device associated with a cell of the group of cells; means for determining MRU configuration for the group of cells based on the number of MRUs and the number of cells, such that one or more cells are assigned with the first number of MRUs for transmission, the one or more cells are assigned with the second number of MRUs for measurement, and the number of concurrent transmissions caused by two distinct cells is no more than a threshold number; means for selecting, based on an identity of the cell and the MRU configuration, a first subset of MRUs from the set of MRUs for the device to perform transmissions; means for selecting, based on the identity of the cell and the MRU configuration, a second subset of MRUs from the set of MRUs for the device to perform measurements; and means for determining, based on the identity of the cell and the MRU configuration, a measurement matrix for the device to perform estimation.

In a fourth aspect, there is provided a computer readable medium comprising program instructions for causing an apparatus to perform at least the method according to the above second aspect.

It is to be understood that the summary section is not intended to identify key or essential features of embodiments of the present disclosure, nor is it intended to be used to limit the scope of the present disclosure. Other features of the present disclosure will become easily comprehensible through the following description.

BRIEF DESCRIPTION OF THE DRAWINGS

Some example embodiments will now be described with reference to the accompanying drawings, where.

Throughout the drawings, the same or similar reference numerals represent the same or similar element.

DETAILED DESCRIPTION

Figure 1:
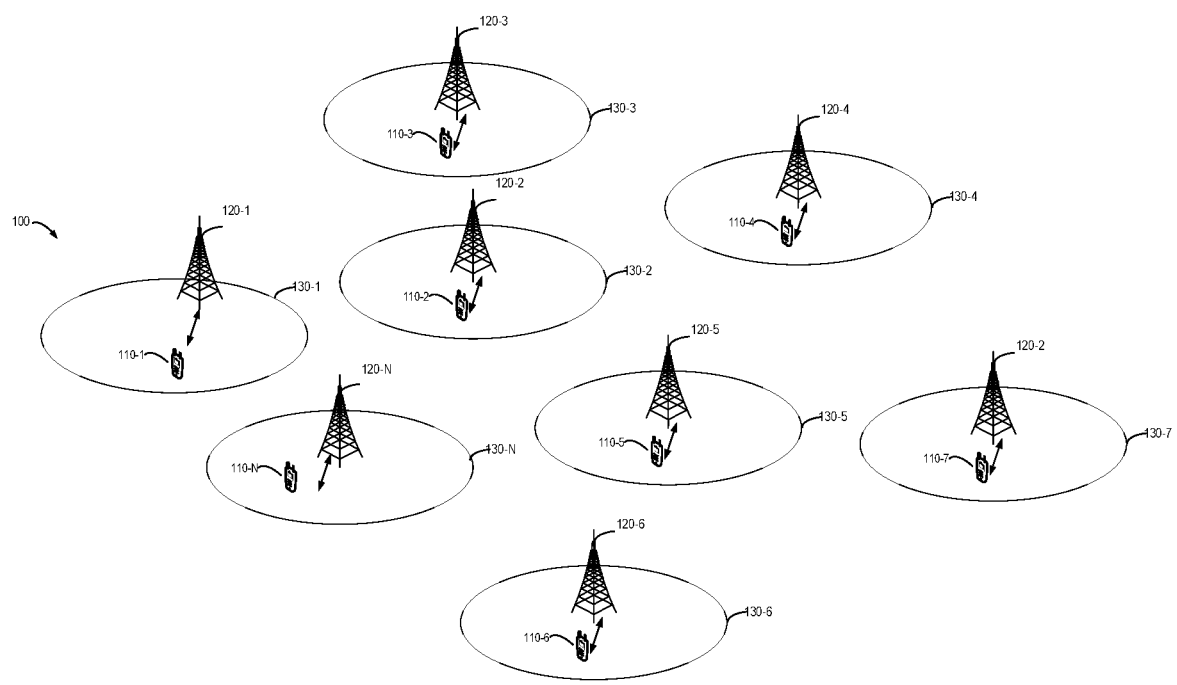
FIG. 1 illustrates a schematic diagram of a communication system according to according to embodiments of the present disclosure.

Principle of the present disclosure will now be described with reference to some example embodiments. It is to be understood that these embodiments are described only for the purpose of illustration and help those skilled in the art to understand and implement the present disclosure, without suggesting any limitation as to the scope of the disclosure. The disclosure described herein can be implemented in various manners other than the ones described below.

In the following description and claims, unless defined otherwise, all technical and scientific terms used herein have the same meaning as commonly understood by one of ordinary skills in the art to which this disclosure belongs.

References in the present disclosure to "one embodiment," "an embodiment," "an example embodiment," and the like indicate that the embodiment described may include a particular feature, structure, or characteristic, but it is not necessary that every embodiment includes the particular feature, structure, or characteristic. Moreover, such phrases are not necessarily referring to the same embodiment. Further, when a particular feature, structure, or characteristic is described in connection with an example embodiment, it is submitted that it is within the knowledge of one skilled in the art to affect such feature, structure, or characteristic in connection with other embodiments whether or not explicitly described.

It shall be understood that although the terms "first" and "second" etc. may be used herein to describe various elements, these elements should not be limited by these terms. These terms are only used to distinguish one element from another. For example, a first element could be termed a second element, and similarly, a second element could be termed a first element, without departing from the scope of example embodiments. As used herein, the term "and/or" includes any and all combinations of one or more of the listed terms.

The terminology used herein is for the purpose of describing particular embodiments only and is not intended to be limiting of example embodiments. As used herein, the singular forms "a", "an" and "the" are intended to include the plural forms as well, unless the context clearly indicates otherwise. It will be further understood that the terms "comprises", "comprising", "has", "having", "includes" and/or "including", when used herein, specify the presence of stated features, elements, and/or components etc., but do not preclude the presence or addition of one or more other features, elements, components and/or combinations thereof.

As used in this application, the term "circuitry" may refer to one or more or all of the following:
(a) hardware-only circuit implementations (such as implementations in only analog and/or digital circuitry) and
(b) combinations of hardware circuits and software, such as (as applicable):

(i) a combination of analog and/or digital hardware circuit(s) with software/firmware and (ii) any portions of hardware processor(s) with software (including digital signal processor(s)), software, and memory(ies) that work together to cause an apparatus, such as a mobile phone or server, to perform various functions) and (c) hardware circuit(s) and or processor(s), such as a microprocessor(s) or a portion of a microprocessor(s), that requires software (e.g., firmware) for operation, but the software may not be present when it is not needed for operation.

This definition of circuitry applies to all uses of this term in this application, including in any claims. As a further example, as used in this application, the term circuitry also covers an implementation of merely a hardware circuit or processor (or multiple processors) or portion of a hardware circuit or processor and its (or their) accompanying software and/or firmware. The term circuitry also covers, for example and if applicable to the particular claim element, a baseband integrated circuit or processor integrated circuit for a mobile device or a similar integrated circuit in server, a cellular network device, or other computing or network device.

As used herein, the term "communication network" refers to a network following any suitable communication standards, such as Long Term Evolution (LTE), LTE-Advanced (LTE-A), Wideband Code Division Multiple Access (WCDMA), High-Speed Packet Access (HSPA), Narrow Band Internet of Things (NB-IoT), New Radio (NR) and so on. Furthermore, the communications between a terminal device and a network device in the communication network may be performed according to any suitable generation communication protocols, including, but not limited to, the first generation (1G), the second generation (2G), 2.5G, 2.75G, the third generation (3G), the fourth generation (4G), 4.5G, the future fifth generation (5G) communication protocols, and/or any other protocols either currently known or to be developed in the future. Embodiments of the present disclosure may be applied in various communication systems. Given the rapid development in communications, there will of course also be future type communication technologies and systems with which the present disclosure may be embodied. It should not be seen as limiting the scope of the present disclosure to only the aforementioned system.

As used herein, the term "network device" refers to a node in a communication network via which a terminal device accesses the network and receives services therefrom. The network device may refer to a base station (BS) or an access point (AP), for example, a node B (NodeB or NB), an evolved NodeB (eNodeB or eNB), a NR NB (also referred to as a gNB), a Remote Radio Unit (RRU), a radio header (RH), a remote radio head (RRH), a relay, a low power node such as a femto, a pico, and so forth, depending on the applied terminology and technology.

The term "terminal device" refers to any end device that may be capable of wireless communication. By way of example rather than limitation, a terminal device may also be referred to as a communication device, user equipment (UE), a Subscriber Station (SS), a Portable Subscriber Station, a Mobile Station (MS), or an Access Terminal (AT). The terminal device may include, but not limited to, a mobile phone, a cellular phone, a smart phone, voice over IP (VoIP) phones, wireless local loop phones, a tablet, a wearable terminal device, a personal digital assistant (PDA), portable computers, desktop computer, image capture terminal devices such as digital cameras, gaming terminal devices, music storage and playback appliances, vehicle-mounted wireless terminal devices, wireless endpoints, mobile stations, laptop-embedded equipment (LEE), laptop-mounted equipment (LME), USB dongles, smart devices, wireless customer-premises equipment (CPE), an Internet of Things (IoT) device, a watch or other wearable, a head-mounted display (HMD), a vehicle, a drone, a medical device and applications (e.g., remote surgery), an industrial device and applications (e.g., a robot and/or other wireless devices operating in an industrial and/or an automated processing chain contexts), a consumer electronics device, a device operating on commercial and/or industrial wireless networks, and the like. In the following description, the terms "terminal device", "communication device", "terminal", "user equipment" and "UE" may be used interchangeably.

Although functionalities described herein can be performed, in various example embodiments, in a fixed and/or a wireless network node may, in other example embodiments, functionalities may be implemented in a user equipment apparatus (such as a cell phone or tablet computer or laptop computer or desktop computer or mobile IOT device or fixed IOT device). This user equipment apparatus can, for example, be furnished with corresponding capabilities as described in connection with the fixed and/or the wireless network node(s), as appropriate. The user equipment apparatus may be the user equipment and/or or a control device, such as a chipset or processor, configured to control the user equipment when installed therein. Examples of such functionalities include the bootstrapping server function and/or the home subscriber server, which may be implemented in the user equipment apparatus by providing the user equipment apparatus with software configured to cause the user equipment apparatus to perform from the point of view of these functions/nodes.

As mentioned above, conventional interference as well as other CSIs measurements may not be accurate. To address these shortcomings and to better support various CoMP schemes, transmission mode 10 which is introduced in release 11 in the 3GPP provides tools for the network to control on which resource elements the interference is measured. The basis is called CSI interference measurement (CSI-IM) configuration. A CSI-IM configuration is a set of resource elements in one subframe in which the device should use for measuring interference. The received power in the resource elements corresponding to the CSI-IM configuration is used as an estimate of the interference (and noise). The single subframe in which the interference should be measured is also specified, thereby avoiding device-specific, and to the network unknown, interference averaging across subframes.

In the 3GPP LTE release 11, configuring a CSI-IM is done in a similar way as a CSI-RS and the same set of configurations is available. In practice, a CSI-IM resource may typically correspond to a CSI-RS resource in which nothing is transmitted from the cell. Thus, the CSI-IM resource may typically be covered by the set of zero-power CSI-RS resources configured for the device. However, CSI-IM and zero-power CSI-RS serve different purposes. The CSI-IM is defined in order to specify a set of resource elements on which a device should measure the interference level while the zero-power CSI-RS is defined in order to specify a set of resource elements avoided by the Physical Downlink Shared Channel (PDSCH) mapping. Since the CSI-IM does not collide with the CRS in neighboring cells but rather the PDSCH (assuming a synchronized network), the interference measurement better reflects the transmission activity in neighboring cells, leading to a more accurate interference estimate at low loads. Hence, with the channel conditions estimated from the CSI-RS and the interference situation estimated from the CSI-IM, the network has detailed control of the interference situation the CSI report reflects. In New Radio (NR) release 15, the terminal device can be independently configured with one or more CSI-IM resource set configuration as indicated by the higher layer parameter CSI-IM-ResourceSet.

For CoMP and various beamforming schemes, the network device (for example, a gNB) benefits from multiple CSI reports, derived under different interference hypotheses. To maximize flexibility in scheduling in the network, the CSI of all possible transmission hypotheses should be reported by the terminal devices. However, the conventional CSI process approach and CSI-IM configuration may lack scalability. If coordination across a large number of nodes is desirable or a large number of potential beam-forming candidates are to be evaluated, there is an exponential increase in the number of CSI processes with a corresponding increase in the CSI-IM overhead.

The LTE/NR networks take advantage of channel-state reports to support the downlink and uplink scheduling. CSI reports, irrespective of whether they are aperiodic or periodic, need the measurements of channel coefficients and interference level. From both types of original measurements, channel-quality indicator (CQI), precoding matrix indicator (PMI), and rank indicator (RI) etc., are calculated out and form an accurate CSI report, indicating the instantaneous downlink and uplink channel quality in both the time and frequency domains. CSI is not only acquired for channel-dependent scheduling, link adaptation, and transmission settings related to multi-antenna transmission, but also for multi-cell cooperation selection in CoMP (coordinated multi-point) and link direction assignment in dynamic TDD (Time Division Duplex). Therefore, it is paramount important to enable the CSI estimation for multiple cells rather than just its serving cell.

Note that measuring the cross-cell interference level is more cumbersome and the measurement is greatly affected by the transmission activity in neighbouring cells, such as cooperation selection in CoMP and link direction assignment in dynamic TDD. In addition, the demands in interference measurement overhead will be further exacerbated in dynamic TDD where UE (User Equipment) is not only required to estimate the DL interference but also UL interference potentially caused by all UEs in the neighbouring cells. The Rel-15 NR TDD frame structure is rather flexible, allowing for DL-only slots, UL-only slots, and bi-directional slots, which are combined to form radio frames. In NR, OFDM (Orthogonal Frequency Division Multiplexing) symbols in a slot can be classified as 'downlink', 'flexible', or 'uplink', as the slot format shown in Table 4.3.2-3 in 3GPP TS 38.211 (v15.1.0). The misalignment in link direction among the neighbouring cells raises the Cross-Link Interference (CLI)—the detrimental UE-UE and TRP-TRP (Transmission Reception Point) interference. CLI is prone to causing the majority of transmission failure in the dynamic TDD system. As a consequence, the cross-cell CSI estimation in NR (New Radio) becomes more complicated, which should be deliberately coordinated to reduce the resource cost to minimum.

For a cellular network with regular hexagonal deployment, one cell is largely interfered by 6 immediately next cells, the inter-cell interference (ICI) caused by the other distant cells are so weak that they can be ignored, especially for macro cell scenario. To carry out multiple CSI reports/processes for arbitrary transmission hypothesis, one gNB/

UE aspires to obtain the complete information of all intending channel and all interfering power across the neighboring cells.

In current LTE/NR system, multiple CSI-RSs are applied with orthogonal separation on time, frequency, or code domain, to support CSI reports for a more arbitrary number of network nodes and antenna ports. This inevitably leads to undesirable price in measurement resource. Moreover, for CoMP and various beamforming schemes, the gNB benefits from multiple CSI reports, derived under different interference hypotheses. To maximize flexibility in scheduling in the network, CSI of all possible transmission hypotheses should be reported by terminal devices. Specifically, one cell has 63 possible transmission hypotheses to be predicted, each of which comprises different combination of interfering cells, as shown in Table 1. (For example, Cell 1 is interfered by interfering cells 2 and 5 under transmission hypothesis T9 in Table 1.) However, one drawback with the current CSI process approach and measurement resource (eg. CSI-RS and CSI-IM) configuration is the lack of scalability for cross-cell CSI acquiring. If coordination across a large number of nodes is desirable or a large number of potential beam-forming candidates are to be evaluated, there is an exponential increase in the number of CSI processes with a corresponding increase in measurement resource. As a result, one measurement period across a large set of subcarriers and time slots might incur the time-selective and frequency-selective effects, based on which a degraded CSI report arrive.

TABLE 1

| Transmission Hypothesis | Cell 1 (Interfered) | Cell 2 (Interfered) | Cell 3 (Interfered) | Cell 4 (Interfered) | Cell 5 (Interfered) | Cell 6 (Interfered) | Cell 7 (Interfered) |
|---|---|---|---|---|---|---|---|
| T1 | 2 | 1 | 1 | 1 | 1 | 1 | 1 |
| T2 | 3 | 3 | 2 | 2 | 2 | 2 | 2 |
| T3 | 4 | 4 | 4 | 3 | 3 | 3 | 3 |
| T4 | 5 | 5 | 5 | 5 | 4 | 4 | 4 |
| T5 | 6 | 6 | 6 | 6 | 6 | 5 | 5 |
| T6 | 7 | 7 | 7 | 7 | 7 | 7 | 6 |
| T7 | 2, 3 | 1, 3 | 1, 2 | 1, 2 | 1, 2 | 1, 2 | 1, 2 |
| T8 | 2, 4 | 1, 4 | 1, 4 | 1, 3 | 1, 3 | 1, 3 | 1, 3 |
| T9 | 2, 5 | 1, 5 | 1, 5 | 1, 5 | 1, 4 | 1, 4 | 1, 4 |
| T10 | 2, 6 | 1, 6 | 1, 6 | 1, 6 | 1, 6 | 1, 5 | 1, 5 |
| T11 | 2, 7 | 1, 7 | 1, 7 | 1, 7 | 1, 7 | 1, 7 | 1, 6 |
| T12 | 3, 4 | 3, 4 | 2, 4 | 2, 3 | 2, 3 | 2, 3 | 2, 3 |
| T13 | 3, 5 | 3, 5 | 2, 5 | 2, 5 | 2, 4 | 2, 4 | 2, 4 |
| T14 | 3, 6 | 3, 6 | 2, 6 | 2, 6 | 2, 6 | 2, 5 | 2, 5 |
| T15 | 3, 7 | 3, 7 | 2, 7 | 2, 7 | 2, 7 | 2, 7 | 2, 6 |
| T16 | 4, 5 | 4, 5 | 4, 5 | 3, 5 | 3, 4 | 3, 4 | 3, 4 |
| T17 | 4, 6 | 4, 6 | 4, 6 | 3, 6 | 3, 6 | 3, 5 | 3, 5 |
| T18 | 4, 7 | 4, 7 | 4, 7 | 3, 7 | 3, 7 | 3, 7 | 3, 6 |
| T19 | 5, 6 | 5, 6 | 5, 6 | 5, 6 | 4, 6 | 4, 5 | 4, 5 |
| T20 | 5, 7 | 5, 7 | 5, 7 | 5, 7 | 4, 7 | 4, 7 | 4, 6 |
| T21 | 6, 7 | 6, 7 | 6, 7 | 6, 7 | 6, 7 | 5, 7 | 5, 6 |
| T22 | 5, 6, 7 | 5, 6, 7 | 5, 6, 7 | 5, 6, 7 | 4, 6, 7 | 4, 5, 7 | 4, 5, 6 |
| T23 | 4, 6, 7 | 4, 6, 7 | 4, 6, 7 | 3, 6, 7 | 3, 6, 7 | 3, 5, 7 | 3, 5, 6 |
| T24 | 4, 5, 7 | 4, 5, 7 | 4, 5, 7 | 3, 5, 7 | 3, 4, 7 | 3, 4, 7 | 3, 4, 6 |
| T25 | 4, 5, 6 | 4, 5, 6 | 4, 5, 6 | 3, 5, 6 | 3, 4, 6 | 3, 4, 5 | 3, 4, 5 |
| T26 | 3, 6, 7 | 3, 6, 7 | 2, 6, 7 | 2, 6, 7 | 2, 6, 7 | 2, 5, 7 | 2, 5, 6 |
| T27 | 3, 5, 7 | 3, 5, 7 | 2, 5, 7 | 2, 5, 7 | 2, 4, 7 | 2, 4, 7 | 2, 4, 6 |
| T28 | 3, 5, 6 | 3, 5, 6 | 2, 5, 6 | 2, 5, 6 | 2, 4, 6 | 2, 4, 5 | 2, 4, 5 |
| T29 | 3, 4, 7 | 3, 4, 7 | 2, 4, 7 | 2, 3, 7 | 2, 3, 7 | 2, 3, 7 | 2, 3, 6 |
| T30 | 3, 4, 6 | 3, 4, 6 | 2, 4, 6 | 2, 3, 6 | 2, 3, 6 | 2, 3, 5 | 2, 3, 5 |
| T31 | 3, 4, 5 | 3, 4, 5 | 2, 4, 5 | 2, 3, 5 | 2, 3, 4 | 2, 3, 4 | 2, 3, 4 |
| T32 | 2, 6, 7 | 1, 6, 7 | 1, 6, 7 | 1, 6, 7 | 1, 6, 7 | 1, 5, 7 | 1, 5, 6 |
| T33 | 2, 5, 7 | 1, 5, 7 | 1, 5, 7 | 1, 5, 7 | 1, 4, 7 | 1, 4, 7 | 1, 4, 6 |
| T34 | 2, 5, 6 | 1, 5, 6 | 1, 5, 6 | 1, 5, 6 | 1, 4, 6 | 1, 4, 5 | 1, 4, 5 |
| T35 | 2, 4, 7 | 1, 4, 7 | 1, 4, 7 | 1, 3, 7 | 1, 3, 7 | 1, 3, 7 | 1, 3, 6 |
| T36 | 2, 4, 6 | 1, 4, 6 | 1, 4, 6 | 1, 3, 6 | 1, 3, 6 | 1, 3, 5 | 1, 3, 5 |
| T37 | 2, 4, 5 | 1, 4, 5 | 1, 4, 5 | 1, 3, 5 | 1, 3, 4 | 1, 3, 4 | 1, 3, 4 |
| T38 | 2, 3, 7 | 1, 3, 7 | 1, 2, 7 | 1, 2, 7 | 1, 2, 7 | 1, 2, 7 | 1, 2, 6 |
| T39 | 2, 3, 6 | 1, 3, 6 | 1, 2, 6 | 1, 2, 6 | 1, 2, 6 | 1, 2, 5 | 1, 2, 5 |
| T40 | 2, 3, 5 | 1, 3, 5 | 1, 2, 5 | 1, 2, 5 | 1, 2, 4 | 1, 2, 4 | 1, 2, 4 |
| T41 | 2, 3, 4 | 1, 3, 4 | 1, 2, 4 | 1, 2, 3 | 1, 2, 3 | 1, 2, 3 | 1, 2, 3 |
| T42 | 4, 5, 6, 7 | 4, 5, 6, 7 | 4, 5, 6, 7 | 3, 5, 6, 7 | 3, 4, 6, 7 | 3, 4, 5, 7 | 3, 4, 5, 6 |
| T43 | 3, 5, 6, 7 | 3, 5, 6, 7 | 2, 5, 6, 7 | 2, 5, 6, 7 | 2, 4, 6, 7 | 2, 4, 5, 7 | 2, 4, 5, 6 |
| T44 | 3, 4, 6, 7 | 3, 4, 6, 7 | 2, 4, 6, 7 | 2, 3, 6, 7 | 2, 3, 6, 7 | 2, 3, 5, 7 | 2, 3, 5, 6 |
| T45 | 3, 4, 5, 7 | 3, 4, 5, 7 | 2, 4, 5, 7 | 2, 3, 5, 7 | 2, 3, 4, 7 | 2, 3, 4, 7 | 2, 3, 4, 6 |
| T46 | 3, 4, 5, 6 | 3, 4, 5, 6 | 2, 4, 5, 6 | 2, 3, 5, 6 | 2, 3, 4, 6 | 2, 3, 4, 5 | 2, 3, 4, 5 |
| T47 | 2, 5, 6, 7 | 1, 5, 6, 7 | 1, 5, 6, 7 | 1, 5, 6, 7 | 1, 4, 6, 7 | 1, 4, 5, 7 | 1, 4, 5, 6 |
| T48 | 2, 4, 6, 7 | 1, 4, 6, 7 | 1, 4, 6, 7 | 1, 3, 6, 7 | 1, 3, 6, 7 | 1, 3, 5, 7 | 1, 3, 5, 6 |
| T49 | 2, 4, 5, 7 | 1, 4, 5, 7 | 1, 4, 5, 7 | 1, 3, 5, 7 | 1, 3, 4, 7 | 1, 3, 4, 7 | 1, 3, 4, 6 |
| T50 | 2, 4, 5, 6 | 1, 4, 5, 6 | 1, 4, 5, 6 | 1, 3, 5, 6 | 1, 3, 4, 6 | 1, 3, 4, 5 | 1, 3, 4, 5 |
| T51 | 2, 3, 6, 7 | 1, 3, 6, 7 | 1, 2, 6, 7 | 1, 2, 6, 7 | 1, 2, 6, 7 | 1, 2, 5, 7 | 1, 2, 5, 6 |
| T52 | 2, 3, 5, 7 | 1, 3, 5, 7 | 1, 2, 5, 7 | 1, 2, 5, 7 | 1, 2, 4, 7 | 1, 2, 4, 7 | 1, 2, 4, 6 |
| T53 | 2, 3, 5, 6 | 1, 3, 5, 6 | 1, 2, 5, 6 | 1, 2, 5, 6 | 1, 2, 4, 6 | 1, 2, 4, 5 | 1, 2, 4, 5 |
| T54 | 2, 3, 4, 7 | 1, 3, 4, 7 | 1, 2, 4, 7 | 1, 2, 3, 7 | 1, 2, 3, 7 | 1, 2, 3, 7 | 1, 2, 3, 6 |
| T55 | 2, 3, 4, 6 | 1, 3, 4, 6 | 1, 2, 4, 6 | 1, 2, 3, 6 | 1, 2, 3, 6 | 1, 2, 3, 5 | 1, 2, 3, 5 |
| T56 | 2, 3, 4, 5 | 1, 3, 4, 5 | 1, 2, 4, 5 | 1, 2, 3, 5 | 1, 2, 3, 4 | 1, 2, 3, 4 | 1, 2, 3, 4 |
| T57 | 2, 3, 4, 5, 6 | 1, 3, 4, 5, 6 | 1, 2, 4, 5, 6 | 1, 2, 3, 5, 6 | 1, 2, 3, 4, 6 | 1, 2, 3, 4, 5 | 1, 2, 3, 4, 5 |
| T58 | 2, 3, 4, 5, 7 | 1, 3, 4, 5, 7 | 1, 2, 4, 5, 7 | 1, 2, 3, 5, 7 | 1, 2, 3, 4, 7 | 1, 2, 3, 4, 7 | 1, 2, 3, 4, 6 |

TABLE 1-continued

| Transmission Hypothesis | Cell 1 (Interfered) | Cell 2 (Interfered) | Cell 3 (Interfered) | Cell 4 (Interfered) | Cell 5 (Interfered) | Cell 6 (Interfered) | Cell 7 (Interfered) |
| --- | --- | --- | --- | --- | --- | --- | --- |
| T59 | 2, 3, 4, 6, 7 | 1, 3, 4, 6, 7 | 1, 2, 4, 6, 7 | 1, 2, 3, 6, 7 | 1, 2, 3, 6, 7 | 1, 2, 3, 5, 7 | 1, 2, 3, 5, 6 |
| T60 | 2, 3, 5, 6, 7 | 1, 3, 5, 6, 7 | 1, 2, 5, 6, 7 | 1, 2, 5, 6, 7 | 1, 2, 4, 6, 7 | 1, 2, 4, 5, 7 | 1, 2, 4, 5, 6 |
| T61 | 2, 4, 5, 6, 7 | 1, 4, 5, 6, 7 | 1, 4, 5, 6, 7 | 1, 3, 5, 6, 7 | 1, 3, 4, 6, 7 | 1, 3, 4, 5, 7 | 1, 3, 4, 5, 6 |
| T62 | 3, 4, 5, 6, 7 | 3, 4, 5, 6, 7 | 2, 4, 5, 6, 7 | 2, 3, 5, 6, 7 | 2, 3, 4, 6, 7 | 2, 3, 4, 5, 7 | 2, 3, 4, 5, 6 |
| T63 | 2, 3, 4, 5, 6, 7 | 1, 3, 4, 5, 6, 7 | 1, 2, 4, 5, 6, 7 | 1, 2, 3, 5, 6, 7 | 1, 2, 3, 4, 6, 7 | 1, 2, 3, 4, 5, 7 | 1, 2, 3, 4, 5, 6 |

Although NR provides a flexible framework for CSI-IM configuration based on an accompanied indicating mechanism, it is required to reserve excessive measurement resource and incurs the indicating cost. The measuring and measured cells/UEs should be informed of the location of measurement resource. The measuring cell/UE should know which cell or UE is associated with its measurement. All of these indicating processes lead to dramatic signaling overhead. In order to measure UE-UE and TRP-TRP cross-cell CSI, on the other hand, one UE/TRP is expected to measure and to be measured. Thus, the transmission and reception modes for all UEs/TRPs should be deliberately coordinated, which further exacerbates signaling penalty. In addition, inter-cell measurement suffers much error than intra-cell measurement, owing to issues of synchronization, larger path loss.

Therefore, in practical implementation of NR, a scalable measurement resource reuse is required for the whole network to coordinate cross-cell CSI estimation at the minimum cost. A scalable configuration seeks for a way that the required measurement resource cannot increase proportional to the size of network (the total number of cells), as well as the total number of CSI processes. Besides, a scalable configuration desires to be uniform for all cells and to endow every cell with the same/similar capability for CSI estimation. Every cell undergoes the equal treatment in measurement resource allocation; they take the same opportunity to measure other cells and to be measured by the others. So they can estimate channel coefficients and interference levels with the similar/same accuracy. Such uniform property is prerequisite for the network to provide the uniform service.

In order to obtain the complete information of all intending channel and all interfering power from the neighboring cells, a direct measurement method is usually considered by measuring the cross-cell channel in one-by-one fashion. This method ruse MRUs for the regular hexagonal cells that assigned with identity numbers {1, 2, 3, 4, 5, 6, 7}. For representation convenience, the cell m represents that the cell is assigned with cell identity number m. The procedures can be shown as:

Step 0: n=1
Step 1: cell n transmits the data or reference signal, while Cells m, for m∈{1,2,3,4,5,6,7}\n, estimate the channel or interference power from the neighboring cell n at the same measurement resource simultaneously.
Step 2: if n<7, then n=n+1 and return to step 1.

The measurement resource is reused by exploiting the geometrical separation and the interference from the non-immediately next cells is neglected. Accordingly, the direct measurement method spends at least 7 orthogonal MRUs for all cross-cell channel estimation. At step 1, the cells can directly estimate the channel or interference power due to one individual cell. Without loss of generality, suppose the estimated suffer the i.i.d. (independently identical distribution) estimation errors, the variance of which is denoted by $\sigma^2$.

Although the individual measurements of interference power can be combined and added to compute the measurements corresponding to different transmission hypothesis, the sum of individuals suffers the accumulated estimation variance as shown in Table 2. For the sake of improving the measurement precision, an immediate approach is to double the measurement resource or to use a dedicated resource for all specific transmission hypothesis to be predicted.

TABLE 2

Interference measurement performance of direct method (normalized to $\sigma^2$)

| Number of interfering cells | Number of realizations | Transmission hypothesis | Mean normalized estimation variance (using 7 MRUs) | Mean normalized estimation variance (using 14 MRUs) |
| --- | --- | --- | --- | --- |
| 1 | 6 | T1-T6 | 1 | 0.5 |
| 2 | 15 | T7-T21 | 2 | 1 |
| 3 | 20 | T22-T41 | 3 | 1.5 |
| 4 | 15 | T42-T56 | 4 | 2 |
| 5 | 6 | T57-T62 | 5 | 2.5 |
| 6 | 1 | T63 | 6 | 3 |
| 1, 2, 3, 4, 5, 6 | 63 | T1-T63 | 3.0476 | 1.5238 |

In order to at least in part solve above and other potential problems, embodiments of the present disclosure provide solutions for interference and CSI measurements. Now some example embodiments of the present disclosure are described below with reference to the figures. However, those skilled in the art would readily appreciate that the detailed description given herein with respect to these figures is for explanatory purpose as the present disclosure extends beyond theses limited embodiments.

According to embodiments of the present disclosure, the MRU configuration is determined based on the number of MRU and the identity of the cell. The MRU configuration is scalable and the set of MRUs is reused by the network. In this way, the resources are saved and the accuracy is improved.

FIG. 1 illustrates a schematic diagram of a communication system in which embodiments of the present disclosure can be implemented. The communication system 100, which is a part of a communication network, comprises a device 110-1, a device 110-2, . . . . , a device 110-N, which can be collectively referred to as "device(s) 110." The communication system 100 further comprises a device 120-1, a device 120-2, . . . . , a device 120-N, which can be collectively referred to as "device(s) 120." The communication system 100 also comprises a cell 130-1, a cell 130-2, . . . , a cell 130-N, which can be collectively referred to as "cell(s) 130." One or more devices are associated with and covered by a cell. It is to be understood that the number of devices and cells shown in FIG. 1 is given for the purpose of illustration without suggesting any limitations. The communication system 100 may comprise any suitable number of devices and cells. In the communication system 100, the device 110 and the device 120 can communicate data and control information to each other. In the case that the device 110 is the terminal device and the device 120 is the network device, a link from the device 120 to the device 110 is referred to as a downlink (DL), while a link from the device 110 to the device 120 is referred to as an uplink (UL). The number of devices shown in FIG. 1 is given for the purpose of illustration without suggesting any limitations.

Communications in the communication system 100 may be implemented according to any proper communication protocol(s), comprising, but not limited to, cellular communication protocols of the first generation (1G), the second generation (2G), the third generation (3G), the fourth generation (4G) and the fifth generation (5G) and on the like, wireless local network communication protocols such as Institute for Electrical and Electronics Engineers (IEEE) 802.11 and the like, and/or any other protocols currently known or to be developed in the future. Moreover, the communication may utilize any proper wireless communication technology, comprising but not limited to: Code Divided Multiple Address (CDMA), Frequency Divided Multiple Address (FDMA), Time Divided Multiple Address (TDMA), Frequency Divided Duplexer (FDD), Time Divided Duplexer (TDD), Multiple-Input Multiple-Output (MIMO), Orthogonal Frequency Divided Multiple Access (OFDMA) and/or any other technologies currently known or to be developed in the future.

Figure 2:
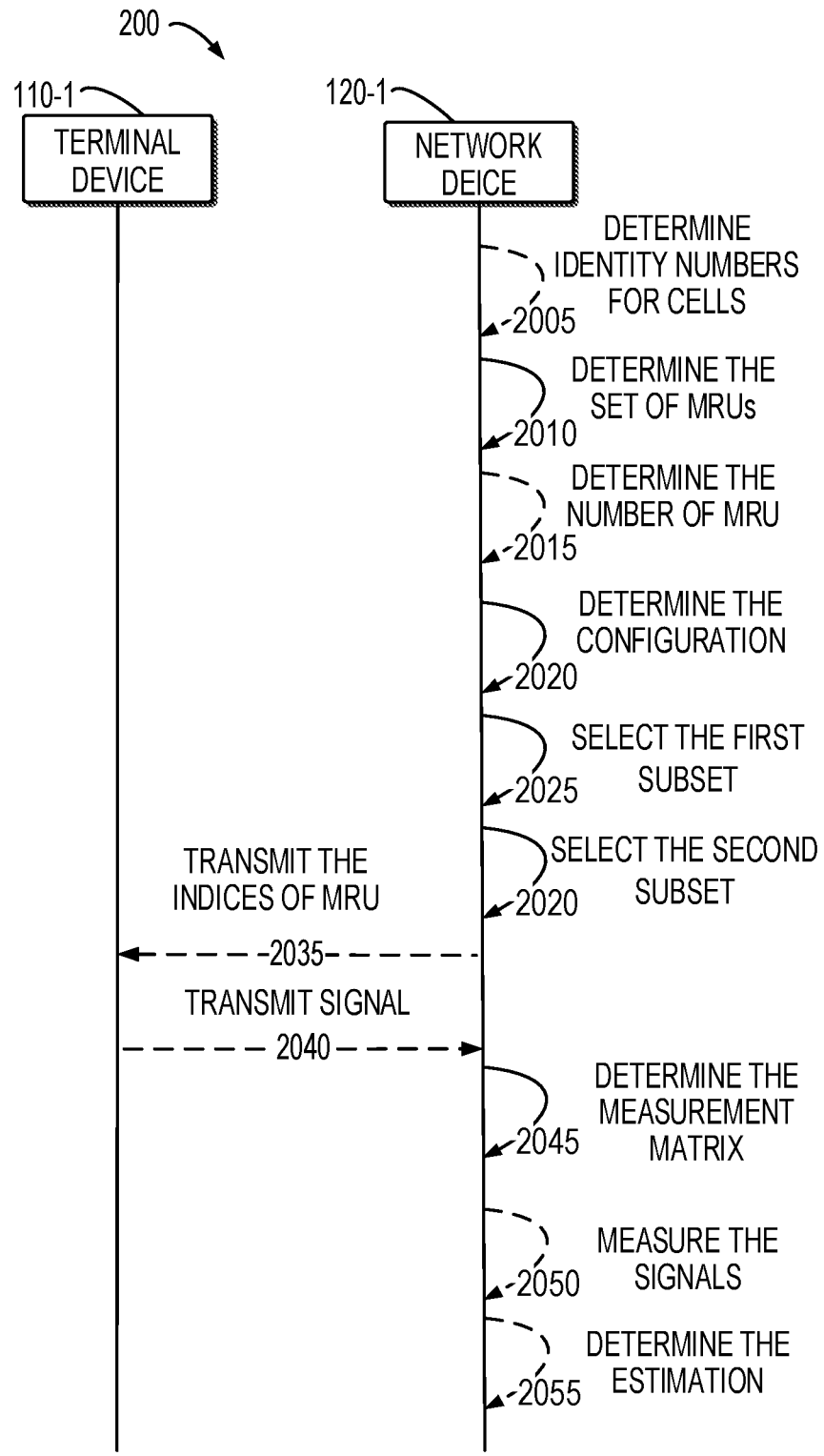
FIG. 2 illustrates a schematic diagram of interactions between devices according to according to embodiments of the present disclosure.

FIG. 2 illustrates a schematic diagram of interactions 200 among devices in accordance with embodiments of the present disclosure. The interactions 200 may be implemented at any suitable devices. Only for the purpose of illustrations, the interactions 200 are described to be implemented at the terminal device 110-1 and the network device 120-1.

Figure 3:
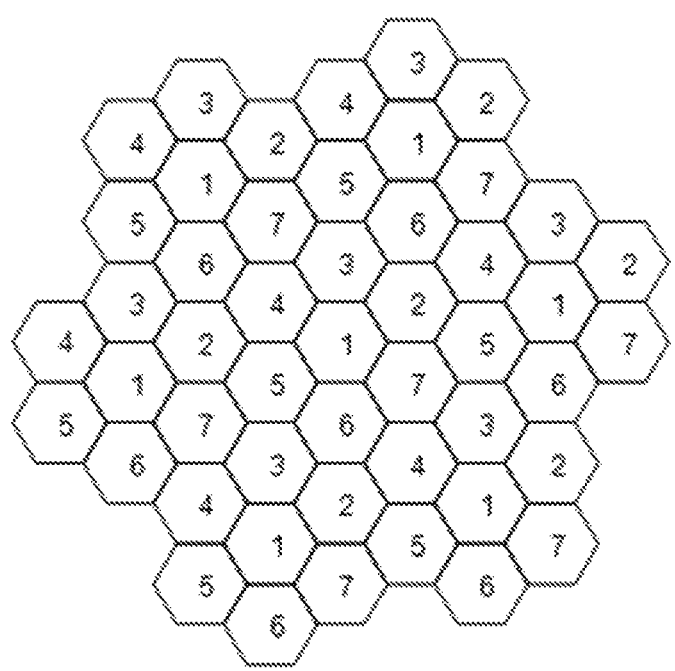
FIG. 3 illustrates a schematic diagram of a communication system according to embodiments of the present disclosure.

The network device 120-1 may determine 2005 the identity number of the group of cells. In some embodiments, in order to facilitate uplink (UL) and downlink (DL) interference measurements, each MRU is configured for one cell to specify a subset of resource elements (REs) avoided by CSI-RS (sounding reference signal) and/or PDSCH (PUSCH), on which a UE (TRP) associated with the cell can measure the channel coefficients and the interference levels from its neighbouring cells that do not mute intentionally on the same subset. In some embodiments, the number of cells in the group of cells 130 is seven. Each cell in the group of cells 130 has an identity number. For example, the cell 130-1 has the identity number "1." Only for the purpose of illustrations, embodiments of the present disclosure are described with the reference of the case where all the cells are indexed by an identity set with seven identity numbers such as {1, 2, 3, 4, 5, 6, 7}. It should be noted that the size of the identity set can be any suitable number, for example, three, four, five or six. FIG. 4 illustrates a schematic diagram of configurations for cell identity number for cross-cell CSI and interference measurement according to embodiments of the present disclosure. As shown in FIG. 3, a cluster of seven neighboring hexagonal cells is configured with cell identity {1, 2, 3, 4, 5, 6, 7}. For the purpose of illustrations, the identity of the cell 130-1 is "1."

The network device 120-1 determines 2010 the set of measurement resource units (MRUs). The term "MRU" used herein refers to physical-layer resources over the time, frequency, space, and code domain that can be used for measuring CSIs among the cells 130. It should be noted that the space domain can be characterized in terms of antenna port and/or beam. The term "interference measurement resource (IMR)" used herein refers to physical-layer resources over the time, frequency, space, and code domain. The terms "MRU" and "IMR" can be interchangeable. In an example embodiment, the MRUs in the set of MRUs are orthogonal to each other. For example, the MRUs may occupy the same subcarrier but across consecutive OFMD symbols. The network deice 120-1 may determine 2015 the number of the MRUs. For example, the number of the MRUs may be 14. Alternatively or in addition, the number may be 12. A Measurement Period (MP) comprises a group of 14 or 12 MRUs. FIGS. 4A-4D illustrates schematic diagrams of the set of MRUs. According to the mapping in FIGS. 4A-4D, the time length of an MP amounts to one slot or one subframe. Assuming each cell schedules the same UL/DL transmission during one MP, the slot is the minimum scheduling granularity in time dimension. In other words, cell k receives the same signals due to its 6 immediately surrounding cells, denoted by a 6-by-1 vector $r_{k_-}$, during one MP.

Figure 4A:
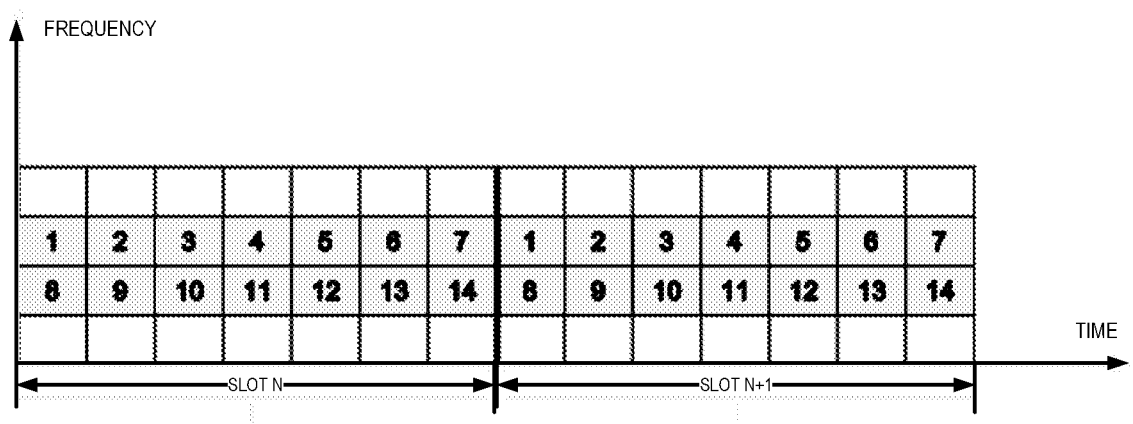
FIGS. 4A-4D illustrate schematic diagram of MRUs according to embodiments of the present disclosure.
Figure 4B:
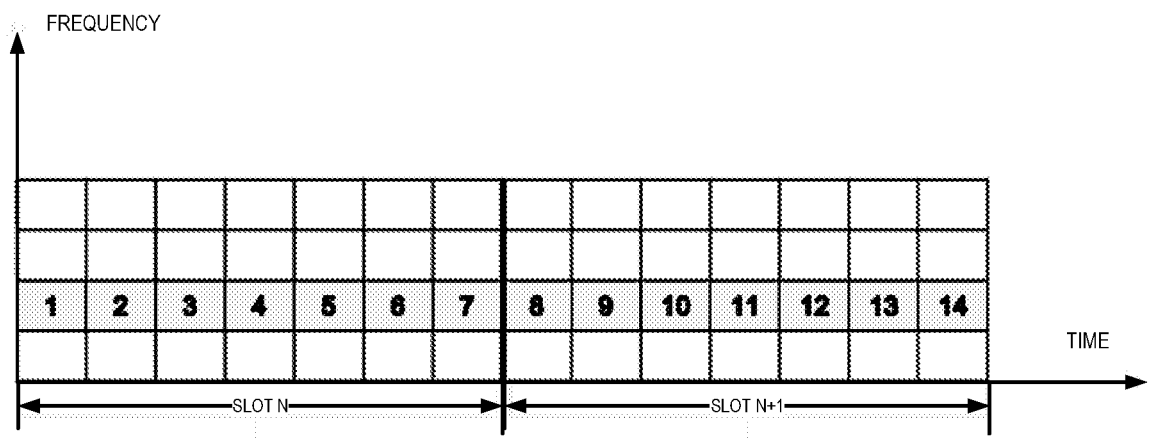

In some embodiments, the network has a normal cyclic prefix. As shown in FIGS. 4A and 4B, one slot comprises 7 OFDM symbols. The set of MRUs which comprise 14 MRUs can be mapped either to one slot or to 2 slots. In FIG. 4A, all 14 MRUs occupy the resource elements in one slot and are across two consecutive sets of subcarriers. In FIG. 4B, all 14 MRUs occupy the resource elements across 2 slots over the same set of subcarriers.

Figure 4C:
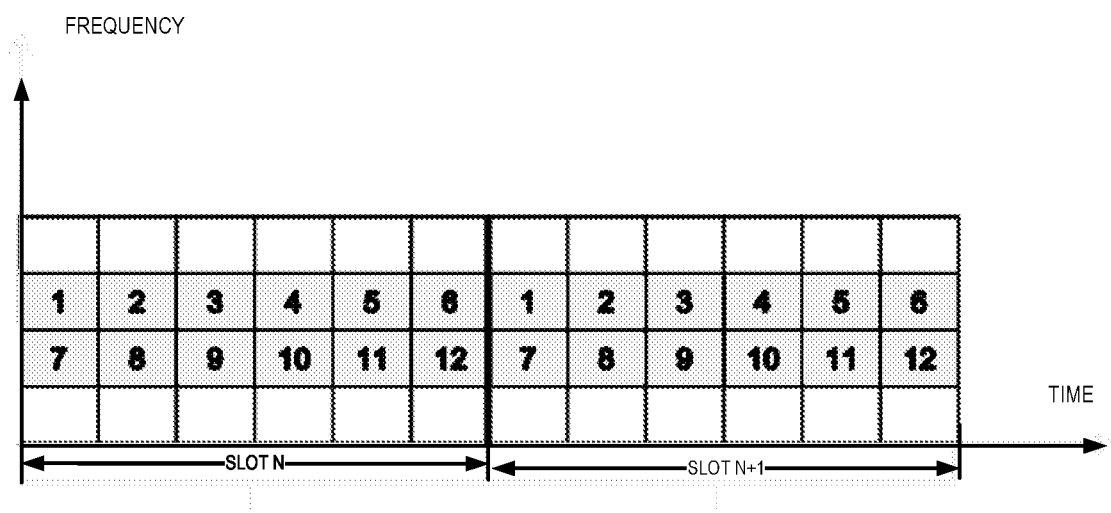
Figure 4D:
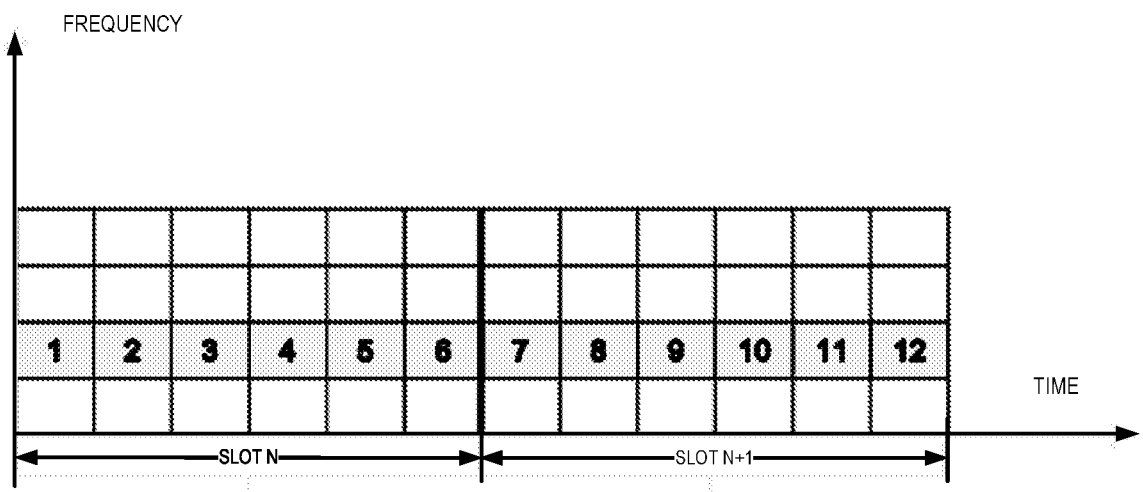

In some embodiments, the network has an extended cyclic prefix. As shown in FIGS. 4C and 4D, one slot comprises 6 OFDM symbols. The set of MRUs which comprises 12 MRUs can be mapped either to one slot or to 2 slots. In FIG. 4C, all 12 MRUs occupy the resource elements only in one slot and are across two consecutive sets of subcarriers. In FIG. 4D, all 12 MRUs occupy the resource elements and are across 2 slots over the same set of subcarriers.

The network device 120-1 determines 2020 the MRU configurations such that one or more cells are assigned with the first number of MRUs for transmission, the one or more cells are assigned with the second number of MRUs for measurement, and the number of concurrent transmissions caused by any two distinct cells is no more than a threshold number. In this way, the MRU configuration may be scalable in a uniform way.

In some embodiment, the MRU configuration may be determined based on a Balanced Incomplete Block Design (BIBD) theory. In some embodiments, the order of cell identity number in the first row can be rearranged and the order of MRU in the first column can also be rearranged. Table 3 below shows an example of MRU configuration $M_{MRC}^{14}$.

TABLE 3

|        | Cell 1 | Cell 2 | Cell 3 | Cell 4 | Cell 5 | Cell 6 | Cell 7 |
|--------|--------|--------|--------|--------|--------|--------|--------|
| MRU 1  | 1      | 1      | 0      | 1      | 0      | 0      | 0      |
| MRU 2  | 1      | 0      | 1      | 0      | 0      | 0      | 1      |
| MRU 3  | 1      | 0      | 0      | 0      | 1      | 1      | 0      |
| MRU 4  | 0      | 1      | 1      | 0      | 1      | 0      | 0      |
| MRU 5  | 0      | 1      | 0      | 0      | 0      | 1      | 1      |
| MRU 6  | 0      | 0      | 1      | 1      | 0      | 1      | 0      |
| MRU 7  | 0      | 0      | 0      | 1      | 1      | 0      | 1      |
| MRU 8  | 0      | 0      | 0      | 1      | 0      | 1      | 1      |
| MRU 9  | 1      | 0      | 0      | 0      | 1      | 0      | 1      |
| MRU 10 | 0      | 1      | 1      | 0      | 0      | 0      | 1      |
| MRU 11 | 0      | 0      | 1      | 0      | 1      | 1      | 0      |
| MRU 12 | 1      | 1      | 0      | 0      | 0      | 1      | 0      |
| MRU 13 | 0      | 1      | 0      | 1      | 1      | 0      | 0      |
| MRU 14 | 1      | 0      | 1      | 1      | 0      | 0      | 0      | where "MRU 1" to "MRU 14" represent the first MRU to the fourteenth MRU in the set of MRUs, respectively, "Cell 1" to "Cell 7" represent the first cell to the seventh cell in the group of cells, respectively, element "0" represents that certain MRU is assigned to certain cell for measurement while element "1" represents that certain cell makes transmission either for UL/DL data or for reference signals on certain MRU. In some example embodiment, the roles of "0" and "1" can be interchanged. It should be noted that the numbers shown in Table 3 are only examples not limitations.

In this way, the CSI and/or interference measurement capability can be scaled up in a balanced way, benefitting the combinational virtue in BIBD. It provides every cell with the similar/same capability of CSI and/or interference measurement.

The configuration matrix in Table 3 maintains the good balanced properties even while permuting the rows and columns. Thus, the configuration matrix in Table 3 may be readily applied to the whole network by taking advantage of the geometric property in cellular network. The entire network only adopts the 7 cell identity numbers, that is, {1, 2, 3, 4, 5, 6, 7}, they are reused by the different cells as shown in FIG. 3. That is, in the communication network, all cells with the same identity are assigned with the same first subset of MRUs for transmission and all cells with the same identity are assigned with the same second subset of MRUs for measurement. Such a reusing way allows any cell and its 6 immediately surrounding cells to form a 7-cell cluster that are associated with 7 different identity numbers, i.e. {1, 2, 3, 4, 5, 6, 7}, even though the identity number of center cell is no longer fixed.

The cells with the same identity number employ the same MRU configuration according to the above Table 3. Accordingly, any cell not only measures the CSI and/or inference from its surrounding cells, but also can be measured by them similarly. As a consequence, every cell exhibits the same balanced properties of CSI and/or interference measurement as discussed, but also the no more than 14 MRUs are re-exploited by entire network.

In some embodiments, the cell may be assigned with 8 MRUs for the network device 120-1 to perform measurements. The cell may be assigned with 6 MRUs for the network device 120-2 to perform transmissions. Any two distinct cells just make concurrent transmission twice during one MP.

In MRU 1, the cells 130-1, 130-2 and 130-4 make data and/or reference signal transmission while the cells 130-3, 130-5, 130-6, and 130-7 measure the corresponding interference and/or channel, simultaneously.

In MRU 2, the cells 130-1, 130-3 and 130-7 make data and/or reference signal transmission while the cells 130-2, 130-4, 130-5, and 130-6 measure the corresponding interference and/or channel, simultaneously.

In MRU 3, the cells 130-1, 130-5 and 130-6 make data and/or reference signal transmission while the cells 130-2, 130-3, 130-4, and 130-7 measure the corresponding interference and/or channel, simultaneously.

In MRU 4, the cells 130-2, 130-3 and 130-5 make data and/or reference signal transmission while the cells 130-1, 130-4, 130-6, and 130-7 measure the corresponding interference and/or channel, simultaneously.

In MRU 5, the cells 130-2, 130-6 and 130-7 make data and/or reference signal transmission while the cells 130-1, 130-3, 130-4, and 130-5 measure the corresponding interference and/or channel, simultaneously.

In MRU 6, cells 3, 4 and 6 make data and/or reference signal transmission while the cells 130-1, 130-2, 130-5, and 130-7 measure the corresponding interference and/or channel, simultaneously.

In MRU 7, the cells 130-4, 130-5 and 130-7 make data and/or reference signal transmission while the cells 130-1, 130-2, 130-3, and 130-6 measure the corresponding interference and/or channel, simultaneously.

In MRU 8, the cells 130-4, 130-6 and 130-7 make data and/or reference signal transmission while the cells 130-1, 130-2, 130-3, and 130-5 measure the corresponding interference and/or channel, simultaneously.

In MRU 9, the cells 130-1, 130-5 and 130-7 make data and/or reference signal transmission while the cells 130-2, 130-3, 130-4, and 130-6 measure the corresponding interference and/or channel, simultaneously.

In MRU 10, the cells 130-2, 130-3 and 130-7 make data and/or reference signal transmission while the cells 130-1, 130-4, 130-5, and 130-6 measure the corresponding interference and/or channel, simultaneously.

In MRU 11, the cells 130-3, 130-5 and 130-6 make data and/or reference signal transmission while the cells 130-1, 130-2, 130-4, and 130-7 measure the corresponding interference and/or channel, simultaneously.

In MRU 12, the cells 130-1, 130-2 and 130-6 make data and/or reference signal transmission while the cells 130-3, 130-4, 130-5, and 130-7 measure the corresponding interference and/or channel, simultaneously.

In MRU 13, the cells 130-2, 130-4 and 130-5 make data and/or reference signal transmission while the cells 130-1, 130-3, 130-6, and 130-7 measure the corresponding interference and/or channel, simultaneously.

In MRU 14, the cells 130-1, 130-3 and 130-4 make data and/or reference signal transmission while the cells 130-2, 130-5, 130-6, and 130-7 measure the corresponding interference and/or channel, simultaneously.

In some embodiments, the network device 120-1 may determine the MRU configuration based on the number of cells in the group of cells. If the number of cells is less than seven, the network device 120 may determine the difference value between the number of cells and seven and generate the MRU configuration by removing columns which correspond to the difference value from Table 3. For example, if the size of cell identity set is less than seven, for example, 6, the network device 120-1 may determine the MRU configuration by removing any one column from Table 3. If the size of cell identity set is 5, the network device 120-1 may determine the MRU configuration by removing any two columns from Table 3. If the size of cell identity set is 4, the network device 120-1 may determine the MRU configuration by removing any three columns from Table 3. If the size of cell identity set is 3, the network device 120-1 may determine the MRU configuration by removing any four columns from Table 4. Only as an example, Table 4 below shows the MRU configuration with 6 cells.

TABLE 4

|        | Cell 1 | Cell 2 | Cell 3 | Cell 4 | Cell 5 | Cell 6 |
|--------|--------|--------|--------|--------|--------|--------|
| MRU 1  | 1 | 1 | 0 | 1 | 0 | 0 |
| MRU 2  | 1 | 0 | 1 | 0 | 0 | 0 |
| MRU 3  | 1 | 0 | 0 | 0 | 1 | 1 |
| MRU 4  | 0 | 1 | 1 | 0 | 1 | 0 |
| MRU 5  | 0 | 1 | 0 | 0 | 0 | 1 |
| MRU 6  | 0 | 0 | 1 | 1 | 0 | 1 |
| MRU 7  | 0 | 0 | 0 | 1 | 1 | 0 |
| MRU 8  | 0 | 0 | 0 | 1 | 0 | 1 |
| MRU 9  | 1 | 0 | 0 | 0 | 1 | 0 |
| MRU 10 | 0 | 1 | 1 | 0 | 0 | 0 |
| MRU 11 | 0 | 0 | 1 | 0 | 1 | 1 |
| MRU 12 | 1 | 1 | 0 | 0 | 0 | 1 |
| MRU 13 | 0 | 1 | 0 | 1 | 1 | 0 |
| MRU 14 | 1 | 0 | 1 | 1 | 0 | 0 |

As stated above, the set of MRUs may comprise twelve MRUs. In order to coordinate a group of 12 MRUs in whole network, the same approach as for 14 MRUs can be applied by replacing $M_{MRC}^{14}$ with a 12-by-7 MRU configuration $M_{MRC}^{12}$. Indeed, matrix $M_{MRC}^{12}$ is a submatrix of $M_{MRC}^{14}$ by removing any two rows. In some embodiments, one row may be removed from rows $\{1, 2, \ldots, 7\}$ and the other row mat be removed from rows $\{8, 9, \ldots, 14\}$.

$$M_{MRC}^{12} \in \{M_{MRC}^{14}(i,j) | i=1,2,\ldots,7, \text{ and } j=8,9,\ldots,14\} \quad (1)$$

where $M_{MRC}^{14}(i, j)$ denotes the submatrix of $M_{MRC}^{14}$ deleting rows i and j.

For example, by deleting rows 2 and 13 from matrix $M_{MRC}^{14}$, the MRU configuration $M_{MRC}^{12}$ can be shown in Table 5. It should be noted that Table 5 is only an example. Table 5 shows an example MRU configuration with twelve MRUs when $M_{MRC}^{12} = M_{MRC}^{14}(2,13)$. Note that the rows of $M_{MRC}^{12}$ corresponds to 12 MRUs in order.

TABLE 5

|        | Cell 1 | Cell 2 | Cell 3 | Cell 4 | Cell 5 | Cell 6 | Cell 7 |
|--------|--------|--------|--------|--------|--------|--------|--------|
| MRU 1  | 1 | 1 | 0 | 1 | 0 | 0 | 0 |
| MRU 2  | 1 | 0 | 0 | 0 | 1 | 1 | 0 |
| MRU 3  | 0 | 1 | 1 | 0 | 1 | 0 | 0 |
| MRU 4  | 0 | 1 | 0 | 0 | 0 | 1 | 1 |
| MRU 5  | 0 | 0 | 1 | 1 | 0 | 1 | 0 |
| MRU 6  | 0 | 0 | 0 | 1 | 1 | 0 | 1 |
| MRU 7  | 0 | 0 | 0 | 1 | 0 | 1 | 1 |
| MRU 8  | 1 | 0 | 0 | 0 | 1 | 0 | 1 |
| MRU 9  | 0 | 1 | 1 | 0 | 0 | 0 | 1 |
| MRU 10 | 0 | 0 | 1 | 0 | 1 | 1 | 0 |
| MRU 11 | 1 | 1 | 0 | 0 | 0 | 1 | 0 |
| MRU 12 | 1 | 0 | 1 | 1 | 0 | 0 | 0 | where "MRU 1" to "MRU 12" represent the first MRU to the twelve MRU in the set of MRUs, respectively, "Cell 1" to "Cell 7" represent the first cell to the seventh cell in the group of cells, respectively, element "0" represents that certain MRU is assigned to certain cell for measurement while element "1" represents that certain cell makes transmission either for UL/DL data or for reference signals on certain MRU. In some example embodiment, the roles of "0" and "1" can be interchanged. It should be noted that the numbers shown in Table 5 are only examples not limitations.

In an example embodiment, the set of MRUs may comprise seven MRUs. Table 6 shows an example of MRU configurations with seven MRUs.

TABLE 6

|        | Cell 1 | Cell 2 | Cell 3 | Cell 4 | Cell 5 | Cell 6 | Cell 7 |
|--------|--------|--------|--------|--------|--------|--------|--------|
| MRU 1  | 1 | 1 | 0 | 1 | 0 | 0 | 0 |
| MRU 2  | 1 | 0 | 1 | 0 | 0 | 0 | 1 |
| MRU 3  | 1 | 0 | 0 | 0 | 1 | 1 | 0 |

TABLE 6-continued

|       | Cell 1 | Cell 2 | Cell 3 | Cell 4 | Cell 5 | Cell 6 | Cell 7 |
|-------|--------|--------|--------|--------|--------|--------|--------|
| MRU 4 | 0      | 1      | 1      | 0      | 1      | 0      | 0      |
| MRU 5 | 0      | 1      | 0      | 0      | 0      | 1      | 1      |
| MRU 6 | 0      | 0      | 1      | 1      | 0      | 1      | 0      |
| MRU 7 | 0      | 0      | 0      | 1      | 1      | 0      | 1      |

In the above Table 6, element "0" represents the device should perform measurements while element "1" represents that the device should perform transmission. In some embodiments, the order of cell identity number in the first row can be rearranged and the order of MRU in the first column can also be rearranged.

In some embodiments, the group of cells with different seven identity numbers use seven different mapping relations, respectively, to configure seven different MRUs. In this way, each cell performs transmission in 3 different MRUs, 3 different cells perform transmission in each MRU, and any two distinct cells perform one concurrent transmission in seven MRUs.

In an example embodiment, the MRU configuration may be obtained from a high-layer signaling. In other embodiment, the MRU configuration may be coordinated among the cells.

The network device 120-1 selects 2025 the first subset of MRUs for transmission based on the identity of the cell and the MRU configuration. For the case with 14 MRUs, according to matrix $M_{MRC}^{14}$, the set of transmission MRUs for Cell 130-1 is {MRUs 1, 2, 3, 9, 12, and 14}. The set of transmission MRUs for Cell 130-2 is {MRUs 1, 4, 5, 10, 12, and 13}. The set of transmission MRUs for Cell 130-3 is {MRUs 2, 4, 6, 10, 11, and 14}. The set of transmission MRUs for Cell 130-4 is {MRUs 1, 6, 7, 8, 13 and 14}. The set of transmission MRUs for Cell 130-5 is {MRUs 3, 4, 7, 9, 11, and 13}. The set of transmission MRUs for Cell 130-6 is {MRUs 3, 5, 6, 8, 11, and 12}. The set of transmission MRUs for Cell 130-7 is {MRUs 2, 5, 7, 8, 9, and 10}. For the case with 12 MRUs, for example a variant of $M_{MRC}^{12}=M_{MRC}^{14}(2,13)$ (as shown in Table 5) is applied, the set of transmission MRUs for Cell 130-1 is {MRUs 1, 2, 8, 11 and 12}. The set of transmission MRUs for Cell 130-2 is {MRUs 1, 3, 4, 9, and 11}. The set of transmission MRUs for Cell 130-3 is {MRUs 1, 2, 4, 6, 7, 8, and 11}. The set of transmission MRUs for Cell 130-4 is {MRUs 1, 5, 6, 7, and 12}. The set of transmission MRUs for Cell 130-5 is {MRUs 2, 3, 6, 8, and 10}. The set of transmission MRUs for Cell 130-6 is {MRUs 2, 4, 5, 7, 10 and 11}. The set of transmission MRUs for Cell 130-7 is {MRUs 4, 6, 7, 8, and 9}.

The network device 120-1 selects 2030 the second subset of MRUs for transmission based on the identity of the cell and the MRU configuration. For the case with 14 MRUs, according to matrix $M_{MRC}^{14}$, the set of measurement MRUs for Cell 130-1 is {MRUs 4, 5, 6, 7, 8, 10, 11, and 13}. The set of measurement MRUs for Cell 130-2 is {MRUs 2, 3, 6, 7, 8, 9, 11, and 14}. The set of measurement MRUs for Cell 130-3 is {MRUs 1, 3, 5, 7, 8, 9, 12, and 13}. The set of measurement MRUs for Cell 130-4 is {MRUs 2, 3, 4, 5, 9, 10, 11, and 12}. The set of measurement MRUs for Cell 130-5 is {MRUs 1, 2, 5, 6, 8, 10, 12, and 14}. The set of measurement MRUs for Cell 130-6 is {MRUs 1, 2, 4, 7, 9, 10, 13, and 14}. The set of measurement MRUs for Cell 130-7 is {MRUs 1, 3, 4, 6, 11, 12, 13, and 14}. For the case with 12 MRUs, for example a variant of $M_{MRC}^{12}=M_{MRC}^{14}(2,13)$ (as shown in Table 5) is applied, the set of measurement MRUs for Cell 130-1 is {MRUs 3, 4, 5, 6, 7, 9, and 10}. The set of measurement MRUs for Cell 130-2 is {MRUs 2, 5, 6, 7, 8, 10, and 12}. The set of measurement MRUs for Cell 130-3 is {MRUs 1, 2, 4, 6, 7, 8, and 11}. The set of measurement MRUs for Cell 130-4 is {MRUs 2, 3, 4, 8, 9, 10, and 11}. The set of measurement MRUs for Cell 130-5 is {MRUs 1, 4, 5, 7, 9, 11, and 12}. The set of measurement MRUs for Cell 130-6 is {MRUs 1, 3, 6, 8, 9, and 12}. The set of measurement MRUs for Cell 130-7 is {MRUs 1, 2, 3, 5, 10, 11, and 12}.

In some embodiments, the network device 120-1 may transmit 2035 the indices of measurement MRUs to DL terminal devices and the indices of transmission MRUs to UL terminal devices. The terminal device 110-1 may transmit 2040 data/reference signals to the network device 120-1.

The network device 120-1 determines 2045 the measurement matrix based on the identity of the cell and the MRU configuration. Every DL UE and UL TRP arranges its measurements in order as an 8-by-1 vector. Assume that the DL UE/UL TRP of Cell k receives the signal $r_{k,j}$ due to its immediately surrounding cell with identity number j. Suppose the signal/power transmitted by the TRP/UE/antenna port/beam $j_m$ (m≥1) associated with Cell j to be $s_{j_m}$, $s_{j_m}$'s can be either data signal or mutual orthogonal reference signals across the TRP/UE/antenna port/beam $j_m$. As a result, the received signal $r_{k,j}$ can be written as $$r_{k,j} = \sum_{m=1}^{M} h_{k,j_m} s_{j_m} \qquad (2)$$

where $h_{k,j_m}$ denotes the channel coefficient from TRP/UE/antenna port/beam $j_m$ associated with cell j to measuring node associated with cell k. M Is the total number of $s_{j_m}$'s. As a result, cell k obtains the measured signal/power vector $m_k$ in terms of:

$$m_k = M_k^{14} r_{k\_} + n_k, k=1,2,\ldots,7 \qquad (3)$$

where $M_k^{14}$ denotes the measurement matrix for cell k. It is a submatrix generated from $M_{MRC}^{14}$ by properly removing certain rows and columns.

In some embodiments, the network device 120-1 may determine the measurement matrix by removing one or more rows and a column from the MRU configuration matrix. The removed one or more rows have "one" element corresponding to the cell associated with the network device, the removed column corresponds to the cell.

For example, the measurement matrix for the cell 130-1 can be obtained by removing the first, second, third, ninth, twelfth and fourteenth rows and the first column. Vector $m_1$ corresponds to a group of received signals measured in MRUs 4, 5, 6, 7, 8, 10, 11, and 13. Vector $n_k$ denotes the measurement error vector incurred by cell k, which can be modelled by a zero mean random vector with covariance matrix $C_{n,k}$.

The vectors of the received signals $r_{k\_}$'s are shown below. In some examples, it should be noted that $r_{k\_}$ can used to model the vector of interference power.

$r_{1-} = [r_{1,2}\ r_{1,3}\ r_{1,4}\ r_{1,5}\ r_{1,6}\ r_{1,7}]^T$ $r_{2-} = [r_{2,1}\ r_{2,3}\ r_{2,4}\ r_{2,5}\ r_{2,6}\ r_{2,7}]^T$ $r_{3-} = [r_{3,1}\ r_{3,2}\ r_{3,4}\ r_{3,5}\ r_{3,6}\ r_{3,7}]^T$ $r_{4-} = [r_{4,1}\ r_{4,2}\ r_{4,3}\ r_{4,5}\ r_{4,6}\ r_{4,7}]^T$ $r_{5-} = [r_{5,1}\ r_{5,2}\ r_{5,3}\ r_{5,4}\ r_{5,6}\ r_{5,7}]^T$ $r_{6-} = [r_{6,1}\ r_{6,2}\ r_{6,3}\ r_{6,4}\ r_{6,5}\ r_{6,7}]^T$ $r_{7-} = [r_{7,1}\ r_{7,2}\ r_{7,3}\ r_{7,4}\ r_{7,5}\ r_{7,6}]^T$

Table 7 below shows the measurement matrix for the cell 130-1.

TABLE 7

|         | Cell 2 | Cell 3 | Cell 4 | Cell 5 | Cell 6 | Cell 7 |
|---------|--------|--------|--------|--------|--------|--------|
| MRU 4   | 1      | 1      | 0      | 1      | 0      | 0      |
| MRU 5   | 1      | 0      | 0      | 0      | 1      | 1      |
| MRU 6   | 0      | 1      | 1      | 0      | 1      | 0      |
| MRU 7   | 0      | 0      | 1      | 1      | 0      | 1      |
| MRU 8   | 0      | 0      | 1      | 0      | 1      | 1      |
| MRU 10  | 1      | 1      | 0      | 0      | 0      | 1      |
| MRU 11  | 0      | 1      | 0      | 1      | 1      | 0      |
| MRU 13  | 1      | 0      | 1      | 1      | 0      | 0      |

For the case with 12 MRUs, for example a variant of $M_{MRC}^{12} = M_{MRC}^{14}(2,13)$ is applied. Similarly, every DL UE and UL TRP arranges its measurements in order as a vector. As a result, the DL UE/UL TRP of cell k obtains the measured signal/power vector $m_k$ in terms of $$m_k = M_k^{12} r_{k-} + n_k, k=1,2,\ldots,7 \qquad (4)$$

where $M_k^{12}$ denotes the measurement matrix for cell k. It is a submatrix generated from $M_{MRC}^{12}$ by properly removing certain rows and columns. For example, $M_1^{12}$ can be figured out, as shown in Table 8, corresponding to $M_{MRC}^{12} = M_{MRC}^{14}(2,13)$. Vector $m_1$ corresponds to a group of received signals/powers measured in MRUs 3, 4, 5, 6, 7, 9, and 10.

For example, the measurement matrix for the cell 130-1 can be obtained by removing the first, second, eighth, eleventh and twelve rows and the first column. Vector $m_1$ corresponds to a group of received signals/powers measured in MRUs 3, 4, 5, 6, 7, 9, and 10. Vector $n_k$ denotes the measurement error vector incurred by cell k, which can be modelled by a zero mean random vector with covariance matrix $C_{n,k}$.

Table 8 below shows the measurement matrix for the cell 130-1.

TABLE 8

|         | Cell 2 | Cell 3 | Cell 4 | Cell 5 | Cell 6 | Cell 7 |
|---------|--------|--------|--------|--------|--------|--------|
| MRU 3   | 1      | 1      | 0      | 1      | 0      | 0      |
| MRU 4   | 1      | 0      | 0      | 0      | 1      | 1      |
| MRU 5   | 0      | 1      | 1      | 0      | 1      | 0      |
| MRU 6   | 0      | 0      | 1      | 1      | 0      | 1      |
| MRU 7   | 0      | 0      | 1      | 0      | 1      | 1      |
| MRU 9   | 1      | 1      | 0      | 0      | 0      | 1      |
| MRU 10  | 0      | 1      | 0      | 1      | 1      | 0      |

DL UE/UL TRP of Cell k makes channel estimation and/or interference measurement by estimating the received signals/powers due to individual cell, i.e. $r_{k-}$. The device in the cell 130-k performs scalable and balanced MRU configuration, obtaining measured vector $m_k = M_k^{14} r_{k-} + n_k$ ($m_k = M_k^{12} r_{k-} + n_k$).

In some embodiment, Best Linear Unbiased Estimator (BLUE) may be applied. The cell 130-k estimates the received signal/power due to an individual cell, i.e. $r_{k-}$, through BLUE:

$$\hat{r}_{k-} = ((M_k^{14})^T C_{n,k}^{-1} M_k^{14})^{-1} (M_k^{14})^T C_{n,k}^{-1} m_k, k=1, 2,\ldots,7 \qquad (5)$$

$$\hat{r}_{k-} = ((M_k^{12})^T C_{n,k}^{-1} M_k^{12})^{-1} (M_k^{12})^T C_{n,k}^{-1} m_k, k=1, 2,\ldots,7 \qquad (6)$$

where $M_k^{14}$ denotes the measurement matrix for cell k which is a submatrix generated from $M_{MRC}^{14}$ by properly removing certain rows and columns, $M_k^{12}$ denotes the measurement matrix for cell k which is a submatrix generated from $M_{MRC}^{12}$ by properly removing certain rows and columns, and $C_{n,k}$ denotes a covariance matrix of measurement error. As a consequence, it obtains $$\hat{r}_{k,j} = \sum_{m=1}^{M} h_{k,j_m} s_{j_m} + e_{k,j}$$

where $e_{k,j}$ represents the estimation error.

The device in the cell 130-k may use $\hat{r}_{k-}$ to estimate the channel coefficient $h_{k,j_m}$ or computing the interference power.

Embodiments of the present disclosure enable the network to measure cross-cell channel and interference, merely costing no more than 14 MRUs. Embodiments of the present disclosure possess the same variance for estimating the individual signal/channel/interference from all cells. In particular, the combinatorial virtue in configuration matrix results in the negative correlation coefficients among the estimations for the different cells, which implies the variance of the sum of the individual estimation can be significantly reduced. The measurement variance of interference power for all transmission hypothesis may be reduced, for example, by 41.67% in average. Although the MRUs are coordinated according to one MRU configuration regardless of transmission hypothesis, it can predict the almost all possible interfering power with lower variance. Remarkably, the reuse of MRUs is perfect fit to LTE and NR numerology, easing the mapping design of measurement resource. Moreover, it exhibits the following advantages of scalability and accuracy.

Embodiments of the present disclosure support complete CSI estimation. In virtue of good combinatorial property of BIBD, all measurement matrices derived from the configuration matrices are full column rank, allowing each cell to create an over-determined linear system and apply BLUE or LS method for resolving the individual received signal due to 6 cells immediately next to it. Thus, the cross-cell channel coefficients and interference level can be estimated through the separated signals, allowing for the complete CSI reports for arbitrary transmission hypotheses.

Embodiments of the present disclosure achieve uniform scalability. Benefitting the good property in BIBD, each cell is equally assigned with 8 MRUs while each cell is to be measured equally by 6 times during one MP. Moreover, any two distinct cells just make concurrent transmission twice during one MP. Such a balanced design provides every cell with the similar/same capability of CSI measurement and interference measurement. The capability of CSI estimation can be scaled up in a uniform way such that the network can offer the uniform coverage and service.

Embodiments of the present disclosure achieve uniform measurement accuracy. All cell possess the similar/same performance against the measurement error, which can be demonstrated by the following numerical analysis on the variance of the estimator. For the reuse of 14 MRUs, the covariance matrix of $\hat{r}_{k_-}$ can be written as $$C_{\hat{r}_{k_-}}((M_k^{14})^T C_{n,k}^{-1} M_k^{14})^{-1}, k=1,2,\ldots,7 \quad (7)$$

When all cells share the same i.i.d. property for $n_k$'s, it assumes that $C_{k,k} = \sigma^2 I$.

Thus, the covariance matrix can be represented as:

$$C_{\hat{r}_{k_-}} = \sigma^2 C_k, k=1,2,\ldots,7 \quad (8)$$

where the normalized covariance matrices $C_k$'s are computed as shown in Tables 9-15

TABLE 9

Normalized covariance matrix for cell 1 ($C_1$)

|  | Cell 2 | Cell 3 | Cell 4 | Cell 5 | Cell 6 | Cell 7 |
|---|---|---|---|---|---|---|
| Cell 2 | 0.5000 | −0.1667 | 0.0833 | −0.1667 | 0.0833 | −0.2500 |
| Cell 3 | −0.1667 | 0.5000 | 0.0833 | −0.1667 | −0.2500 | 0.0833 |
| Cell 4 | 0.0833 | 0.0833 | 0.5000 | −0.2500 | −0.1667 | −0.1667 |
| Cell 5 | −0.1667 | −0.1667 | −0.2500 | 0.5000 | 0.0833 | 0.0833 |
| Cell 6 | 0.0833 | −0.2500 | −0.1667 | 0.0833 | 0.5000 | −0.1667 |
| Cell 7 | −0.2500 | 0.0833 | −0.1667 | 0.0833 | −0.1667 | 0.5000 |

TABLE 10

Normalized covariance matrix for cell 2 ($C_2$)

|  | Cell 1 | Cell 3 | Cell 4 | Cell 5 | Cell 6 | Cell 7 |
|---|---|---|---|---|---|---|
| Cell 1 | 0.5000 | −0.2500 | 0.0833 | −0.1667 | 0.0833 | −0.1667 |
| Cell 3 | −0.2500 | 0.5000 | −0.1667 | 0.0833 | −0.1667 | 0.0833 |
| Cell 4 | 0.0833 | −0.1667 | 0.5000 | 0.0833 | −0.1667 | −0.2500 |
| Cell 5 | −0.1667 | 0.0833 | 0.0833 | 0.5000 | −0.2500 | −0.1667 |
| Cell 6 | 0.0833 | −0.1667 | −0.1667 | −0.2500 | 0.5000 | 0.0833 |
| Cell 7 | −0.1667 | 0.0833 | −0.2500 | −0.1667 | 0.0833 | 0.5000 |

TABLE 11

Normalized covariance matrix for cell 3 ($C_3$)

|  | Cell 1 | Cell 2 | Cell 4 | Cell 5 | Cell 6 | Cell 7 |
|---|---|---|---|---|---|---|
| Cell 1 | 0.5000 | −0.1667 | 0.0833 | −0.2500 | −0.1667 | 0.0833 |
| Cell 2 | −0.1667 | 0.5000 | −0.2500 | 0.0833 | −0.1667 | 0.0833 |
| Cell 4 | 0.0833 | −0.2500 | 0.5000 | −0.1667 | 0.0833 | −0.1667 |
| Cell 5 | −0.2500 | 0.0833 | −0.1667 | 0.5000 | 0.0833 | −0.1667 |
| Cell 6 | −0.1667 | −0.1667 | 0.0833 | 0.0833 | 0.5000 | −0.2500 |
| Cell 7 | 0.0833 | 0.0833 | −0.1667 | −0.1667 | −0.2500 | 0.5000 |

TABLE 12

Normalized covariance matrix for cell 4 ($C_4$)

|  | Cell 1 | Cell 2 | Cell 3 | Cell 5 | Cell 6 | Cell 7 |
|---|---|---|---|---|---|---|
| Cell 1 | 0.5000 | 0.0833 | 0.0833 | −0.1667 | −0.1667 | −0.2500 |
| Cell 2 | 0.0833 | 0.5000 | −0.1667 | 0.0833 | −0.2500 | −0.1667 |
| Cell 3 | 0.0833 | −0.1667 | 0.5000 | −0.2500 | 0.0833 | −0.1667 |
| Cell 5 | −0.1667 | 0.0833 | −0.2500 | 0.5000 | −0.1667 | 0.0833 |
| Cell 6 | −0.1667 | −0.2500 | 0.0833 | −0.1667 | 0.5000 | 0.0833 |
| Cell 7 | −0.2500 | −0.1667 | −0.1667 | 0.0833 | 0.0833 | 0.5000 |

TABLE 13

Normalized covariance matrix for cell 5 ($C_5$)

|  | Cell 1 | Cell 2 | Cell 3 | Cell 4 | Cell 6 | Cell 7 |
|---|---|---|---|---|---|---|
| Cell 1 | 0.5000 | −0.2500 | −0.1667 | −0.1667 | 0.0833 | 0.0833 |
| Cell 2 | −0.2500 | 0.5000 | 0.0833 | 0.0833 | −0.1667 | −0.1667 |
| Cell 3 | −0.1667 | 0.0833 | 0.5000 | −0.1667 | 0.0833 | −0.2500 |
| Cell 4 | −0.1667 | 0.0833 | −0.1667 | 0.5000 | −0.2500 | 0.0833 |
| Cell 6 | 0.0833 | −0.1667 | 0.0833 | −0.2500 | 0.5000 | −0.1667 |
| Cell 7 | 0.0833 | −0.1667 | −0.2500 | 0.0833 | −0.1667 | 0.5000 |

TABLE 14

Normalized covariance matrix for cell 6 ($C_6$)

|  | Cell 1 | Cell 2 | Cell 3 | Cell 4 | Cell 5 | Cell 7 |
|---|---|---|---|---|---|---|
| Cell 1 | 0.5000 | 0.0833 | −0.1667 | −0.2500 | 0.0833 | −0.1667 |
| Cell 2 | 0.0833 | 0.5000 | −0.2500 | −0.1667 | −0.1667 | 0.0833 |
| Cell 3 | −0.1667 | −0.2500 | 0.5000 | 0.0833 | 0.0833 | −0.1667 |
| Cell 4 | −0.2500 | −0.1667 | 0.0833 | 0.5000 | −0.1667 | 0.0833 |
| Cell 5 | 0.0833 | −0.1667 | 0.0833 | −0.1667 | 0.5000 | −0.2500 |
| Cell 7 | −0.1667 | 0.0833 | −0.1667 | 0.0833 | −0.2500 | 0.5000 |

TABLE 15

Normalized covariance matrix for cell 7 ($C_7$)

|  | Cell 1 | Cell 2 | Cell 3 | Cell 4 | Cell 5 | Cell6 |
|---|---|---|---|---|---|---|
| Cell 1 | 0.5000 | −0.1667 | 0.0833 | −0.1667 | 0.0833 | −0.2500 |
| Cell 2 | −0.1667 | 0.5000 | 0.0833 | −0.1667 | −0.2500 | 0.0833 |
| Cell 3 | 0.0833 | 0.0833 | 0.5000 | −0.2500 | −0.1667 | −0.1667 |
| Cell 4 | −0.1667 | −0.1667 | −0.2500 | 0.5000 | 0.0833 | 0.0833 |
| Cell 5 | 0.0833 | −0.2500 | −0.1667 | 0.0833 | 0.5000 | −0.1667 |
| Cell 6 | −0.2500 | 0.0833 | −0.1667 | 0.0833 | −0.1667 | 0.5000 |

It can be seen that all diagonal elements of the normalized covariance matrices coincide with 0.5, which is due to the fact that the different measurement matrices $M_k^{14}$'s, corresponding to different cells, have the same set of singular values $\{3.4641, 2, 1.7321, 1.721, 1, 1\}$. This means that all the BLUEs for different cells and different estimated signals/interference powers undergo the same variance, i.e., $$\text{var}\{e_{k,j}\} = 0.5\sigma^2, k,j=1,2,\ldots,7 \quad (9)$$

With the proposed method, different cells can reduce the variance of measurement error by the same proportional factor 0.5 for all the individual estimating signals.

On the other hand, it can be seen that there are the negative non-diagonal elements in the normalized covariance matrices, which implies the variance of the sum of the individual estimations can be significantly reduced. Different cells have the same distribution of the normalized estimation variance, demonstrating the balanced capability in CSI and interference measurement.

Figure 5:
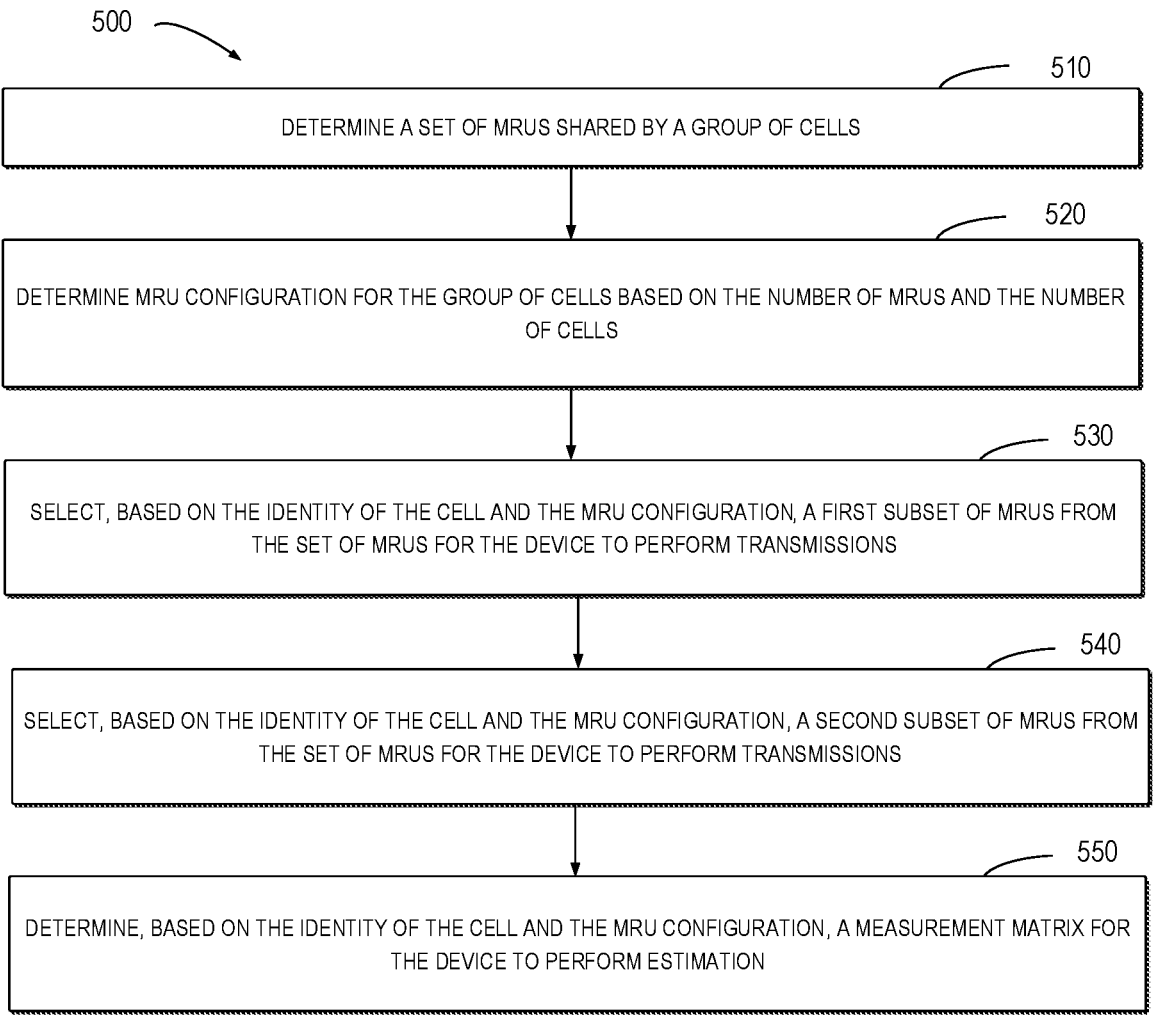
FIG. 5 illustrates a flow chart of a method according to embodiments of the present disclosure.

FIG. 5 illustrates a flow chart of method 500. The method 500 can be implemented at any suitable devices. For example, the method may be implemented at the terminal device 110. Alternatively or in addition, the method 500 may be implemented at the network device 120. Only for the purpose of illustrations, the method 600 is described to be implemented at the network device 120-1.

At block 510, the network device 120-1 determines a set of MRUs shared by a group of cells 130. In an example embodiment, the MRUs in the set of MRUs are orthogonal to each other. For example, the MRUs may occupy the same subcarrier but across consecutive OFMD symbols. The network deice 120-1 may determine 2015 the number of the MRUs. For example, the number of the MRUs may be 14.

At block 520, the network device 120-1 determines the MRU configuration for the group of cells 130 based on the number of MRUs and the number of cells, such that one or more cells are assigned with the first number of MRUs for transmission, the one or more cells are assigned with the second number of MRUs for measurement, and the number of concurrent transmissions caused by two distinct cells is no more than a threshold number. In some embodiment, the mapping relation may be determined based on a Balanced Incomplete Block Design (BIBD) theory. In some embodiments, the order of cell identity number in the first row can be rearranged and the order of MRU in the first column can also be rearranged.

In some embodiments, if there are 14 MRUs, the cell may be assigned with 8 MRUs for the network device 120-1 to perform measurements. The cell may be assigned with 6 MRUs for the network device 120-2 to perform transmissions. Any two distinct cells just make concurrent transmission twice during one MP.

In some embodiments, if there are 12 MRUs, the cell may be assigned with 6, 7 or 8 MRUs for the network device 120-1 to perform measurements. The cell may be assigned with 6, 5, or 4 MRUs for the network device 120-2 to perform transmissions. Any two distinct cells just make concurrent transmission twice during one MP.

At block 530, the network device 120-1 selects, based on an identity of the cell 130-1 and the MRU configuration, the first subset of MRUs from the set of MRUs for the device to perform transmissions. For the case with 14 MRUs, according to matrix $M_{MRC}^{14}$, the set of transmission MRUs for Cell 130-1 is {MRUs 1, 2, 3, 9, 12, and 14}. The set of transmission MRUs for Cell 130-2 is {MRUs 1, 4, 5, 10, 12, and 13}. The set of transmission MRUs for Cell 130-3 is {MRUs 2, 4, 6, 10, 11, and 14}. The set of transmission MRUs for Cell 130-4 is {MRUs 1, 6, 7, 8, 13 and 14}. The set of transmission MRUs for Cell 130-5 is {MRUs 3, 4, 7, 9, 11, and 13}. The set of transmission MRUs for Cell 130-6 is {MRUs 3, 5, 6, 8, 11, and 12}. The set of transmission MRUs for Cell 130-7 is {MRUs 2, 5, 7, 8, 9, and 10}. For the case with 12 MRUs, for example a variant of $M_{MRC}^{12}=M_{MRC}^{14}(2,13)$ (as shown in Table 5) is applied, the set of transmission MRUs for Cell 130-1 is {MRUs 1, 2, 8, 11 and 12}. The set of transmission MRUs for Cell 130-2 is {MRUs 1, 3, 4, 9, and 11}. The set of transmission MRUs for Cell 130-3 is {MRUs 1, 2, 4, 6, 7, 8, and 11}. The set of transmission MRUs for Cell 130-4 is {MRUs 1, 5, 6, 7, and 12}. The set of transmission MRUs for Cell 130-5 is {MRUs 2, 3, 6, 8, and 10}. The set of transmission MRUs for Cell 130-6 is {MRUs 2, 4, 5, 7, 10 and 11}. The set of transmission MRUs for Cell 130-7 is {MRUs 4, 6, 7, 8, and 9}.

At block 540, the network device 120-1 selects, based on the identity of the cell 130-1 and the MRU configuration, a second subset of MRUs from the set of MRUs for the device to perform measurements. For the case with 14 MRUs, according to matrix $M_{MRC}^{14}$, the set of measurement MRUs for Cell 130-1 is {MRUs 4, 5, 6, 7, 8, 10, 11, and 13}. The set of measurement MRUs for Cell 130-2 is {MRUs 2, 3, 6, 7, 8, 9, 11, and 14}. The set of measurement MRUs for Cell 130-3 is {MRUs 1, 3, 5, 7, 8, 9, 12, and 13}. The set of measurement MRUs for Cell 130-4 is {MRUs 2, 3, 4, 5, 9, 10, 11, and 12}. The set of measurement MRUs for Cell 130-5 is {MRUs 1, 2, 5, 6, 8, 10, 12, and 14}. The set of measurement MRUs for Cell 130-6 is {MRUs 1, 2, 4, 7, 9, 10, 13, and 14}. The set of measurement MRUs for Cell 130-7 is {MRUs 1, 3, 4, 6, 11, 12, 13, and 14}. For the case with 12 MRUs, for example a variant of $M_{MRC}^{12}=M_{MRC}^{14}(2,13)$ (as shown in Table 4) is applied, the set of measurement MRUs for Cell 130-1 is {MRUs 3, 4, 5, 6, 7, 9, and 10}. The set of measurement MRUs for Cell 130-2 is {MRUs 2, 5, 6, 7, 8, 10, and 12}. The set of measurement MRUs for Cell 130-3 is {MRUs 1, 2, 4, 6, 7, 8, and 11}. The set of measurement MRUs for Cell 130-4 is {MRUs 2, 3, 4, 8, 9, 10, and 11}. The set of measurement MRUs for Cell 130-5 is {MRUs 1, 4, 5, 7, 9, 11, and 12}. The set of measurement MRUs for Cell 130-6 is {MRUs 1, 3, 6, 8, 9, and 12}. The set of measurement MRUs for Cell 130-7 is {MRUs 1, 2, 3, 5, 10, 11, and 12}.

At block 550, the network device 120-1 determines, based on the identity of the cell 130-1 and the MRU configuration, a measurement matrix for the device to perform estimation. In some embodiments, the network device 120-1 may determine the measurement matrix by removing one or more rows and a column from the MRU configuration matrix. The removed one or more rows have "one" element corresponding to the cell associated with the network device, the removed column corresponds to the cell.

In some embodiments, the network device 120-1 may estimate an signal/interference caused by each cell in the group based on the measured signals/interferences and determine a device with a strongest interference or determine the interference level under certain transmission hypotheses based on the estimation. For example, the network device 120-k in the cell 130-k estimates the individual signal/interference power $\hat{r}_{k-}$ by solving the formula below.

$$\hat{r}_{k-} = \arg \min_{x \in R_+^{6 \times 1}} \|M_k x - m_k\|^2 \quad (10)$$

where a favorable non-negative approximate vector is determined with least squares.

According to embodiments of the present disclosure, good scalability for interference measurement can be achieved. It merely pays no more than 14 MRUs to predict the interference level under the various transmission hypotheses and to enable multiple CSI processes. It has the advantages of scalability, accuracy, and overhead.

Figure 6:
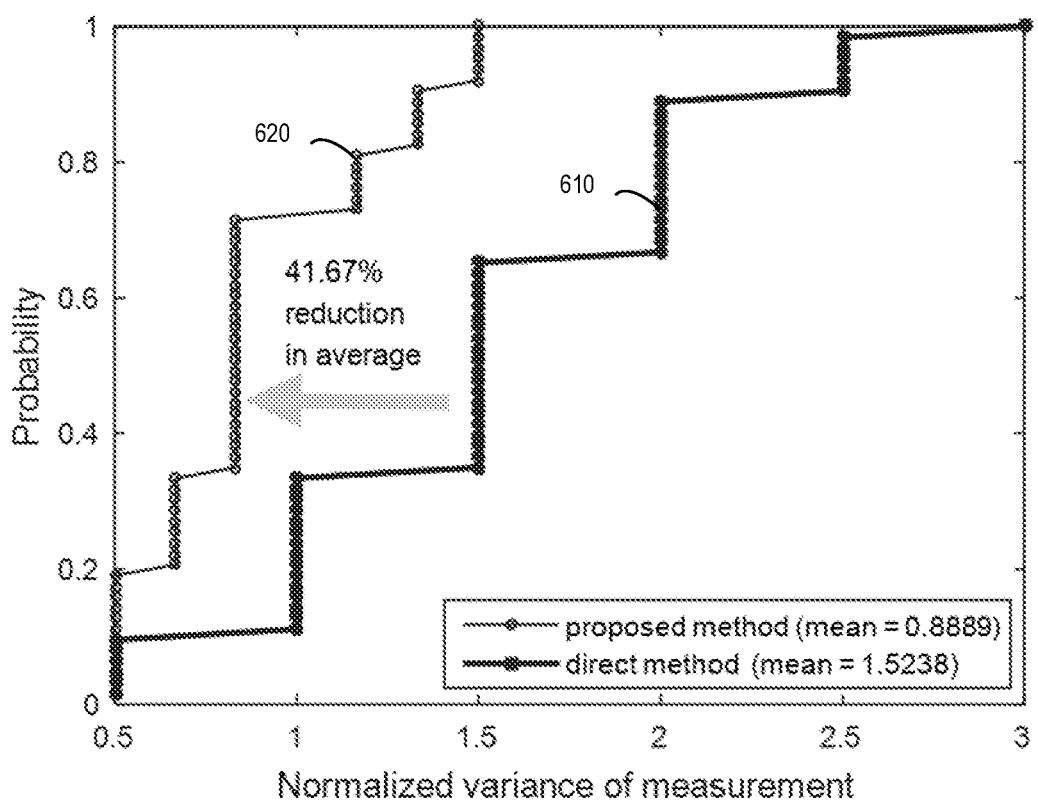
FIG. 6 illustrates a plot of comparison between embodiments of the present disclosure and conventional technologies.

FIG. 6 shows the Cumulative Distribution Function (CDF) of normalized measurement variances over all transmission hypotheses, where each curve consists of 63 points. From the line 610 which represents the conventional method and the line 620 which represents embodiments of the present disclosure, embodiments of the present disclosure can reduce the normalized estimation variance, for example, by 41.67%.

In some embodiments, an apparatus for performing the method 500 (for example, the network device 120 or the terminal device 110) may comprise respective means for performing the corresponding steps in the method 500. These means may be implemented in any suitable manners. For example, it can be implemented by circuitry or software modules.

In some embodiments, the apparatus comprises: means for determining, at a device, a set of measurement resource units, MRUs, shared by a group of cells, the device associated with a cell of the group of cells; means for determining MRU configuration for the group of cells based on the number of MRUs and the number of cells, such that one or more cells are assigned with the first number of MRUs for transmission, the one or more cells are assigned with the second number of MRUs for measurement, and the number of concurrent transmissions caused by any two distinct cells is no more than a threshold number; means for selecting, based on an identity of the cell and the MRU configuration, a first subset of MRUs from the set of MRUs for the device to perform transmissions; means for selecting, based on the identity of the cell and the MRU configuration, a second subset of MRUs from the set of MRUs for the device to perform measurements; and means for determining, based on the identity of the cell and the MRU configuration, a measurement matrix for the device to perform estimation.

In some embodiments, means for determining the MRU configuration for the group of cells based on the number of MRUs and the number of cells comprises: means for in accordance with a determination that the number of cells is seven and the number of MRUs is fourteen, determining that: the first number of MRUs is six, the second number of MRUs is eight, and the threshold number is two.

In some embodiments, the means for determining the MRU configuration for the group of cells based on the number of MRUs and the number of cells comprises: means for in accordance with a determination that the number of cells is seven and the number of MRUs is twelve, determining an MRU configuration by removing two MRUs and corresponding rows from a table as follows, such that the first number of MRUs is six, five, or four, the second number of MRUs is six, seven, or eight:

In some embodiments, the means for determining the measurement matrix for the device comprises: means for determining a submatrix from the MRU configuration by removing rows in which elements corresponding to the cell associated with the device is one, and a column corresponding to the cell associated with the device.

In some embodiments, all cells with the same identity are assigned with the same first subset of MRUs for transmission, all cells with the same identity are assigned with the same second subset of MRUs for measurement.

In some embodiments, the apparatus further comprises means for receiving, signals from other cells in the group of cells on the second subset of MRUs; means for estimating the signal from an individual cell based on the received signals and the measurement matrix; and means for determining CSI based on the individual signal.

In some embodiments, the device comprises a terminal device or a network device.

Figure 7:
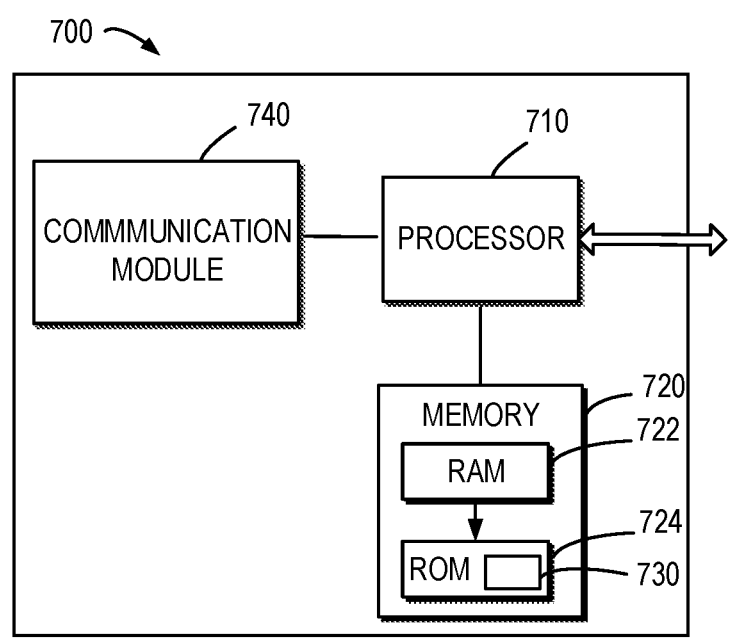
FIG. 7 illustrates a simplified block diagram of an apparatus that is suitable for implementing embodiments of the present disclosure.

FIG. 7 is a simplified block diagram of a device 700 that is suitable for implementing embodiments of the present disclosure. The device 700 may be provided to implement the communication device, for example the device 110, or the device 120 as shown in FIG. 1. As shown, the device 700 includes one or more processors 710, one or more memories 720 coupled to the processor 710, and one or more communication modules 740 coupled to the processor 710.

The communication module 740 is for bidirectional communications. The communication module 740 has at least one antenna to facilitate communication. The communication interface may represent any interface that is necessary for communication with other network elements.

The processor 710 may be of any type suitable to the local technical network and may include one or more of the following: general purpose computers, special purpose computers, microprocessors, digital signal processors (DSPs) and processors based on multicore processor architecture, as non-limiting examples. The device 700 may have multiple processors, such as an application specific integrated circuit chip that is slaved in time to a clock which synchronizes the main processor.

The memory 720 may include one or more non-volatile memories and one or more volatile memories. Examples of the non-volatile memories include, but are not limited to, a Read Only Memory (ROM) 724, an electrically programmable read only memory (EPROM), a flash memory, a hard disk, a compact disc (CD), a digital video disk (DVD), and other magnetic storage and/or optical storage. Examples of the volatile memories include, but are not limited to, a random access memory (RAM) 722 and other volatile memories that will not last in the power-down duration.

A computer program 7320 includes computer executable instructions that are executed by the associated processor 710. The program 7320 may be stored in the ROM 724. The processor 710 may perform any suitable actions and processing by loading the program 7320 into the RAM 722.

The embodiments of the present disclosure may be implemented by means of the program 520 so that the device 700 may perform any process of the disclosure as discussed with reference to FIGS. 2 and 5. The embodiments of the present disclosure may also be implemented by hardware or by a combination of software and hardware.

Figure 8:
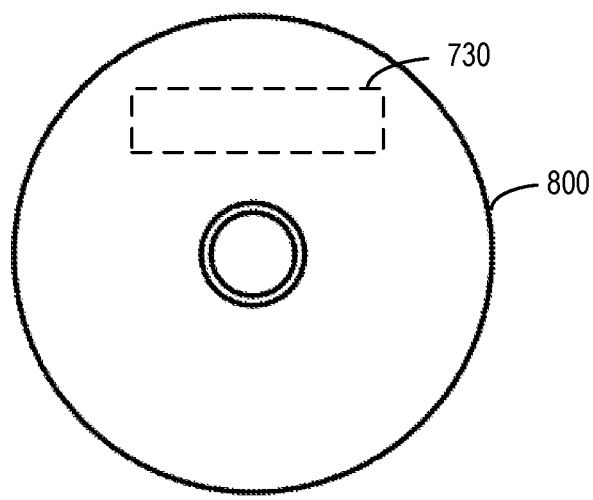
FIG. 8 illustrates a block diagram of an example computer readable medium in accordance with some example embodiments of the present disclosure.

In some example embodiments, the program 7320 may be tangibly contained in a computer readable medium which may be included in the device 700 (such as in the memory 720) or other storage devices that are accessible by the device 700. The device 700 may load the program 7320 from the computer readable medium to the RAM 722 for execution. The computer readable medium may include any types of tangible non-volatile storage, such as ROM, EPROM, a flash memory, a hard disk, CD, DVD, and the like. FIG. 8 shows an example of the computer readable medium 800 in form of CD or DVD. The computer readable medium has the program 730 stored thereon.

It should be appreciated that future networks may utilize network functions virtualization (NFV) which is a network architecture concept that proposes virtualizing network node functions into "building blocks" or entities that may be operationally connected or linked together to provide services. A virtualized network function (VNF) may comprise one or more virtual machines running computer program codes using standard or general type servers instead of customized hardware. Cloud computing or data storage may also be utilized. In radio communications, this may mean node operations to be carried out, at least partly, in a central/centralized unit, CU, (e.g. server, host or node) operationally coupled to distributed unit, DU, (e.g. a radio head/node). It is also possible that node operations will be distributed among a plurality of servers, nodes or hosts. It should also be understood that the distribution of labour between core network operations and base station operations may vary depending on implementation.

In an embodiment, the server may generate a virtual network through which the server communicates with the distributed unit. In general, virtual networking may involve a process of combining hardware and software network resources and network functionality into a single, software-based administrative entity, a virtual network. Such virtual network may provide flexible distribution of operations between the server and the radio head/node. In practice, any digital signal processing task may be performed in either the CU or the DU and the boundary where the responsibility is shifted between the CU and the DU may be selected according to implementation.

Therefore, in an embodiment, a CU-DU architecture is implemented. In such case the device 700 may be comprised in a central unit (e.g. a control unit, an edge cloud server, a server) operatively coupled (e.g. via a wireless or wired network) to a distributed unit (e.g. a remote radio head/node). That is, the central unit (e.g. an edge cloud server) and the distributed unit may be stand-alone apparatuses communicating with each other via a radio path or via a wired connection. Alternatively, they may be in a same entity communicating via a wired connection, etc. The edge cloud or edge cloud server may serve a plurality of distributed units or a radio access networks. In an embodiment, at least some of the described processes may be performed by the central unit. In another embodiment, the apparatus 500 may be instead comprised in the distributed unit, and at least some of the described processes may be performed by the distributed unit.

In an embodiment, the execution of at least some of the functionalities of the device 700 may be shared between two physically separate devices (DU and CU) forming one operational entity. Therefore, the apparatus may be seen to depict the operational entity comprising one or more physically separate devices for executing at least some of the described processes. In an embodiment, such CU-DU architecture may provide flexible distribution of operations between the CU and the DU. In practice, any digital signal processing task may be performed in either the CU or the DU and the boundary where the responsibility is shifted between the CU and the DU may be selected according to implementation. In an embodiment, the device 700 controls the execution of the processes, regardless of the location of the apparatus and regardless of where the processes/functions are carried out.

Generally, various embodiments of the present disclosure may be implemented in hardware or special purpose circuits, software, logic or any combination thereof. Some aspects may be implemented in hardware, while other aspects may be implemented in firmware or software which may be executed by a controller, microprocessor or other computing device. While various aspects of embodiments of the present disclosure are illustrated and described as block diagrams, flowcharts, or using some other pictorial representations, it is to be understood that the block, apparatus, system, technique or method described herein may be implemented in, as non-limiting examples, hardware, software, firmware, special purpose circuits or logic, general purpose hardware or controller or other computing devices, or some combination thereof.

The present disclosure also provides at least one computer program product tangibly stored on a non-transitory computer readable storage medium. The computer program product includes computer-executable instructions, such as those included in program modules, being executed in a device on a target real or virtual processor, to carry out the method 500 as described above with reference to FIG. 5. Generally, program modules include routines, programs, libraries, objects, classes, components, data structures, or the like that perform particular tasks or implement particular abstract data types. The functionality of the program modules may be combined or split between program modules as desired in various embodiments. Machine-executable instructions for program modules may be executed within a local or distributed device. In a distributed device, program modules may be located in both local and remote storage media.

Program code for carrying out methods of the present disclosure may be written in any combination of one or more programming languages. These program codes may be provided to a processor or controller of a general purpose computer, special purpose computer, or other programmable data processing apparatus, such that the program codes, when executed by the processor or controller, cause the functions/operations specified in the flowcharts and/or block diagrams to be implemented. The program code may execute entirely on a machine, partly on the machine, as a stand-alone software package, partly on the machine and partly on a remote machine or entirely on the remote machine or server.

In the context of the present disclosure, the computer program codes or related data may be carried by any suitable carrier to enable the device, apparatus or processor to perform various processes and operations as described above. Examples of the carrier include a signal, computer readable medium, and the like.

The computer readable medium may be a computer readable signal medium or a computer readable storage medium. A computer readable medium may include but not limited to an electronic, magnetic, optical, electromagnetic, infrared, or semiconductor system, apparatus, or device, or any suitable combination of the foregoing. More specific examples of the computer readable storage medium would include an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing.

Further, while operations are depicted in a particular order, this should not be understood as requiring that such operations be performed in the particular order shown or in sequential order, or that all illustrated operations be performed, to achieve desirable results. In certain circumstances, multitasking and parallel processing may be advantageous. Likewise, while several specific implementation details are contained in the above discussions, these should not be construed as limitations on the scope of the present disclosure, but rather as descriptions of features that may be specific to particular embodiments. Certain features that are described in the context of separate embodiments may also be implemented in combination in a single embodiment. Conversely, various features that are described in the context of a single embodiment may also be implemented in multiple embodiments separately or in any suitable sub-combination.

Although the present disclosure has been described in languages specific to structural features and/or methodological acts, it is to be understood that the present disclosure defined in the appended claims is not necessarily limited to the specific features or acts described above. Rather, the specific features and acts described above are disclosed as example forms of implementing the claims.

What is claimed is:

1. A device, comprising:
   at least one processor; and
   at least one memory including computer program codes;
   the at least one memory and the computer program codes are configured to, with the at least one processor, cause the device to:
   determine a set of measurement resource units, MRUs, shared by a group of cells, the device associated with a cell of the group of cells;
   determine MRU configuration for the group of cells based on the number of MRUs and the number of cells, such that
   one or more cells are assigned with the first number of MRUs for transmission,
   the one or more cells are assigned with the second number of MRUs for measurement, and
   the number of concurrent transmissions caused by any two distinct cells is no more than a threshold number;
   select, based on an identity of the cell and the MRU configuration, a first subset of MRUs from the set of MRUs for the device to perform transmissions;
   select, based on the identity of the cell and the MRU configuration, a second subset of MRUs from the set of MRUs for the device to perform measurements; and
   determine, based on the identity of the cell and the MRU configuration, a measurement matrix for the device to perform estimation.

2. The device of claim 1, wherein the device is caused to determine the MRU configuration for the group of cells based on the number of MRUs and the number of cells by:
   in accordance with a determination that the number of cells is seven and the number of MRUs is fourteen, determining that: the first number of MRUs is six, the second number of MRUs is eight, and the threshold number is two.

3. The device of claim 2, wherein the MRU configuration are as follows:

|        | Cell 1 | Cell 2 | Cell 3 | Cell 4 | Cell 5 | Cell 6 | Cell 7 |
|--------|--------|--------|--------|--------|--------|--------|--------|
| MRU 1  | 1 | 1 | 0 | 1 | 0 | 0 | 0 |
| MRU 2  | 1 | 0 | 1 | 0 | 0 | 0 | 1 |
| MRU 3  | 1 | 0 | 0 | 0 | 1 | 1 | 0 |
| MRU 4  | 0 | 1 | 1 | 0 | 1 | 0 | 0 |
| MRU 5  | 0 | 1 | 0 | 0 | 0 | 1 | 1 |
| MRU 6  | 0 | 0 | 1 | 1 | 0 | 1 | 0 |
| MRU 7  | 0 | 0 | 0 | 1 | 1 | 0 | 1 |
| MRU 8  | 0 | 0 | 0 | 1 | 0 | 1 | 1 |
| MRU 9  | 1 | 0 | 0 | 0 | 1 | 0 | 1 |
| MRU 10 | 0 | 1 | 1 | 0 | 0 | 0 | 1 |
| MRU 11 | 0 | 0 | 1 | 0 | 1 | 1 | 0 |
| MRU 12 | 1 | 1 | 0 | 0 | 0 | 1 | 0 |
| MRU 13 | 0 | 1 | 0 | 1 | 1 | 0 | 0 |
| MRU 14 | 1 | 0 | 1 | 1 | 0 | 0 | 0 | wherein "MRU 1" to "MRU 14" represent the first MRU to the fourteenth MRU in the set of MRUs, respectively, "Cell 1" to "Cell 7" represent the first cell to the seventh cell in the group of cells, respectively, "1" represents performing transmission and "0" represents performing measurement.

4. The device of claim 1, wherein the device is caused to determine the MRU configuration for the group of cells based on the number of MRUs and the number of cells by:
in accordance with a determination that the number of cells is seven and the number of MRUs is twelve, determining an MRU configuration by removing two MRUs and corresponding rows from a table as follows, such that the first number of MRUs is six, five, or four, the second number of MRUs is six, seven, or eight:

|        | Cell 1 | Cell 2 | Cell 3 | Cell 4 | Cell 5 | Cell 6 | Cell 7 |
|--------|--------|--------|--------|--------|--------|--------|--------|
| MRU 1  | 1 | 1 | 0 | 1 | 0 | 0 | 0 |
| MRU 2  | 1 | 0 | 1 | 0 | 0 | 0 | 1 |
| MRU 3  | 1 | 0 | 0 | 0 | 1 | 1 | 0 |
| MRU 4  | 0 | 1 | 1 | 0 | 1 | 0 | 0 |
| MRU 5  | 0 | 1 | 0 | 0 | 0 | 1 | 1 |
| MRU 6  | 0 | 0 | 1 | 1 | 0 | 1 | 0 |
| MRU 7  | 0 | 0 | 0 | 1 | 1 | 0 | 1 |
| MRU 8  | 0 | 0 | 0 | 1 | 0 | 1 | 1 |
| MRU 9  | 1 | 0 | 0 | 0 | 1 | 0 | 1 |
| MRU 10 | 0 | 1 | 1 | 0 | 0 | 0 | 1 |
| MRU 11 | 0 | 0 | 1 | 0 | 1 | 1 | 0 |
| MRU 12 | 1 | 1 | 0 | 0 | 0 | 1 | 0 |
| MRU 13 | 0 | 1 | 0 | 1 | 1 | 0 | 0 |
| MRU 14 | 1 | 0 | 1 | 1 | 0 | 0 | 0 | wherein "MRU 1" to "MRU 14" represent the first MRU to the fourteenth MRU in the set of MRUs, respectively, "Cell 1" to "Cell 7" represent the first cell to the seventh cell in the group of cells, respectively, "1" represents performing transmission and "0" represents performing measurement.

5. The device of claim 1, wherein the device is caused to determine the measurement matrix for the device by:
determining a submatrix from the MRU configuration by removing rows in which elements corresponding to the cell associated with the device is one, and a column corresponding to the cell associated with the device.

6. The device of claim 1, wherein all cells with the same identity are assigned with the same first subset of MRUs for transmission, all cells with the same identity are assigned with the same second subset of MRUs for measurement.

7. The device of claim 1, wherein the device is further caused to:
receive, signals from other cells in the group of cells on the second subset of MRUs;
estimate the signal from an individual cell based on the received signals and the measurement matrix; and
determine channel state information, CSI, based on the estimated individual signal.

8. The device of claim 1, wherein the device comprises a terminal device or a network device.

9. A method, comprising:
determining, at a device, a set of measurement resource units, MRUs, shared by a group of cells, the device associated with a cell of the group of cells;
determining MRU configuration for the group of cells based on the number of MRUs and the number of cells, such that
one or more cells are assigned with the first number of MRUs for transmission,
the one or more cells are assigned with the second number of MRUs for measurement, and
the number of concurrent transmissions caused by any two distinct cells is no more than a threshold number;

selecting, based on an identity of the cell and the MRU configuration, a first subset of MRUs from the set of MRUs for the device to perform transmissions;

selecting, based on the identity of the cell and the MRU configuration, a second subset of MRUs from the set of MRUs for the device to perform measurements; and determining, based on the identity of the cell and the MRU configuration, a measurement matrix for the device to perform estimation.

10. The method of claim 9, wherein determining the MRU configuration for the group of cells based on the number of MRUs and the number of cells comprises:

in accordance with a determination that the number of cells is seven and the number of MRUs is fourteen, determining that: the first number of MRUs is six, the second number of MRUs is eight, and the threshold number is two.

11. The method of claim 10, wherein the MRU configuration are as follows:

|        | Cell 1 | Cell 2 | Cell 3 | Cell 4 | Cell 5 | Cell 6 | Cell 7 |
|--------|--------|--------|--------|--------|--------|--------|--------|
| MRU 1  | 1      | 1      | 0      | 1      | 0      | 0      | 0      |
| MRU 2  | 1      | 0      | 1      | 0      | 0      | 0      | 1      |
| MRU 3  | 1      | 0      | 0      | 0      | 1      | 1      | 0      |
| MRU 4  | 0      | 1      | 1      | 0      | 1      | 0      | 0      |
| MRU 5  | 0      | 1      | 0      | 0      | 0      | 1      | 1      |
| MRU 6  | 0      | 0      | 1      | 1      | 0      | 1      | 0      |
| MRU 7  | 0      | 0      | 0      | 1      | 1      | 0      | 1      |
| MRU 8  | 0      | 0      | 0      | 1      | 0      | 1      | 1      |
| MRU 9  | 1      | 0      | 0      | 0      | 1      | 0      | 1      |
| MRU 10 | 0      | 1      | 1      | 0      | 0      | 0      | 1      |
| MRU 11 | 0      | 0      | 1      | 0      | 1      | 1      | 0      |
| MRU 12 | 1      | 1      | 0      | 0      | 0      | 1      | 0      |
| MRU 13 | 0      | 1      | 0      | 1      | 1      | 0      | 0      |
| MRU 14 | 1      | 0      | 1      | 1      | 0      | 0      | 0      | wherein "MRU 1" to "MRU 14" represent the first MRU to the fourteenth MRU in the set of MRUs, respectively, "Cell 1" to "Cell 7" represent the first cell to the seventh cell in the group of cells, respectively, "1" represents performing transmission and "0" represents performing measurement.

12. The method of claim 9, wherein determining the MRU configuration for the group of cells based on the number of MRUs and the number of cells comprises:

in accordance with a determination that the number of cells is seven and the number of MRUs is twelve, determining an MRU configuration by removing two MRUs and corresponding rows from a table as follows, such that the first number of MRUs is six, five, or four, the second number of MRUs is six, seven, or eight:

|        | Cell 1 | Cell 2 | Cell 3 | Cell 4 | Cell 5 | Cell 6 | Cell 7 |
|--------|--------|--------|--------|--------|--------|--------|--------|
| MRU 1  | 1      | 1      | 0      | 1      | 0      | 0      | 0      |
| MRU 2  | 1      | 0      | 1      | 0      | 0      | 0      | 1      |
| MRU 3  | 1      | 0      | 0      | 0      | 1      | 1      | 0      |
| MRU 4  | 0      | 1      | 1      | 0      | 1      | 0      | 0      |
| MRU 5  | 0      | 1      | 0      | 0      | 0      | 1      | 1      |
| MRU 6  | 0      | 0      | 1      | 1      | 0      | 1      | 0      |
| MRU 7  | 0      | 0      | 0      | 1      | 1      | 0      | 1      |
| MRU 8  | 0      | 0      | 0      | 1      | 0      | 1      | 1      |
| MRU 9  | 1      | 0      | 0      | 0      | 1      | 0      | 1      |
| MRU 10 | 0      | 1      | 1      | 0      | 0      | 0      | 1      |
| MRU 11 | 0      | 0      | 1      | 0      | 1      | 1      | 0      |
| MRU 12 | 1      | 1      | 0      | 0      | 0      | 1      | 0      |
| MRU 13 | 0      | 1      | 0      | 1      | 1      | 0      | 0      |
| MRU 14 | 1      | 0      | 1      | 1      | 0      | 0      | 0      | wherein "MRU 1" to "MRU 14" represent the first MRU to the fourteenth MRU in the set of MRUs, respectively, "Cell 1" to "Cell 7" represent the first cell to the seventh cell in the group of cells, respectively, "1" represents performing transmission and "0" represents performing measurement.

13. The method of claim 9, wherein determining the measurement matrix for the device comprises:
   determining a submatrix from the MRU configuration by removing rows in which elements corresponding to the cell associated with the device is one, and a column corresponding to the cell associated with the device.

14. The method of claim 9, wherein all cells with the same identity are assigned with the same first subset of MRUs for transmission, all cells with the same identity are assigned with the same second subset of MRUs for measurement.

15. The method of claim 9, further comprising:
   receiving, signals from other cells in the group of cells on the second subset of MRUs;
   estimating the signal from an individual cell based on the received signals and the measurement matrix; and
   determining channel state information, CSI, based on the estimated individual signal.

16. The method of claim 9, wherein the device comprises a terminal device or a network device.

17. An apparatus, comprising:
   means for determining, at a device, a set of measurement resource units, MRUs, shared by a group of cells, the device associated with a cell of the group of cells;
   means for determining MRU configuration for the group of cells based on the number of MRUs and the number of cells, such that
      one or more cells are assigned with the first number of MRUs for transmission,
      the one or more cells are assigned with the second number of MRUs for measurement, and
      the number of concurrent transmissions caused by any two distinct cells is below a threshold number;
   means for selecting, based on an identity of the cell and the MRU configuration, a first subset of MRUs from the set of MRUs for the device to perform transmissions;
   means for selecting, based on the identity of the cell and the MRU configuration, a second subset of MRUs from the set of MRUs for the device to perform measurements; and
   means for determining, based on the identity of the cell and the MRU configuration, a measurement matrix for the device to perform estimation.

18. A computer program embodied on a non-transitory computer-readable storage medium, said computer program comprising program instructions stored thereon, the instructions, when executed by an apparatus, causing the apparatus to perform the method of claim 9.

* * * * *